(12) United States Patent
Ishikawa et al.

(10) Patent No.: US 11,448,150 B2
(45) Date of Patent: Sep. 20, 2022

(54) ENGINE CONTROL DEVICE AND ENGINE CONTROL METHOD

(71) Applicant: Hitachi Astemo, Ltd., Hitachinaka (JP)

(72) Inventors: Yoshimasa Ishikawa, Hitachinaka (JP); Shinya Sato, Hitachinaka (JP)

(73) Assignee: Hitachi Astemo, Ltd., Hitachinaka (JP)

( * ) Notice: Subject to any disclaimer, the term of this patent is extended or adjusted under 35 U.S.C. 154(b) by 0 days.

(21) Appl. No.: 17/292,521

(22) PCT Filed: Oct. 18, 2019

(86) PCT No.: PCT/JP2019/041031
§ 371 (c)(1),
(2) Date: May 10, 2021

(87) PCT Pub. No.: WO2020/100519
PCT Pub. Date: May 22, 2020

(65) Prior Publication Data
US 2021/0396190 A1 Dec. 23, 2021

(30) Foreign Application Priority Data

Nov. 12, 2018 (JP) .............................. JP2018-212398

(51) Int. Cl.
*F02D 41/14* (2006.01)
*F02D 41/00* (2006.01)
(Continued)

(52) U.S. Cl.
CPC ..... *F02D 41/1401* (2013.01); *F02D 41/0087* (2013.01); *F02D 41/182* (2013.01);
(Continued)

(58) Field of Classification Search
CPC ............. F02D 41/1401; F02D 41/0087; F02D 41/182; F02D 2041/1431;
(Continued)

(56) References Cited

U.S. PATENT DOCUMENTS

| | | | | |
|---|---|---|---|---|
| 5,751,579 A | * | 5/1998 | Hrovat ................... | B60K 28/16 701/71 |
| 6,006,717 A | * | 12/1999 | Suzuki .................. | F02D 41/023 123/295 |

(Continued)

FOREIGN PATENT DOCUMENTS

| | | | | |
|---|---|---|---|---|
| JP | 02267342 A | * | 11/1990 | ............. F02D 41/28 |
| JP | 2001-193524 A | | 7/2001 | |

(Continued)

OTHER PUBLICATIONS

International Search Report (PCT/ISA/210) issued in PCT Application No. PCT/JP2019/041031 dated Feb. 10, 2020 with English translation (four (4) pages).

(Continued)

*Primary Examiner* — Joseph J Dallo
(74) *Attorney, Agent, or Firm* — Crowell & Moring LLP

(57) ABSTRACT

For an engine that draws a complicated torque trajectory, it has been taken a lot of time to adapt a time constant for calculation of estimated torque. Therefore, an ECU 102 includes a target torque calculation unit 203 that calculates target torque of an engine for which torque-based engine control is performed using estimated torque, and an estimated torque calculation unit 210 that calculates the estimated torque by calculating a primary delay coefficient 304 equivalent to a time constant calculated for each control cycle based on a change in an actual intake air amount with respect to a target intake air amount of air sucked into the engine and performing primary delay processing on the target torque using the primary delay coefficient 304.

13 Claims, 18 Drawing Sheets

(51) Int. Cl.
*F02D 41/18* (2006.01)
*F02P 5/15* (2006.01)

(52) U.S. Cl.
CPC .... *F02P 5/1504* (2013.01); *F02D 2041/1431* (2013.01); *F02D 2041/1432* (2013.01); *F02D 2200/1004* (2013.01)

(58) Field of Classification Search
CPC ..... F02D 2041/1432; F02D 2200/1004; F02D 37/02; F02D 41/0007; F02D 41/18; F02D 2250/18; F02P 5/1504; Y02T 10/12; Y02T 10/40
See application file for complete search history.

(56) References Cited

U.S. PATENT DOCUMENTS

| | | | |
|---|---|---|---|
| 6,227,163 B1 | 5/2001 | Enoki et al. | |
| 2005/0022782 A1* | 2/2005 | Ueda | F02D 41/1497 123/339.19 |
| 2007/0113827 A1* | 5/2007 | Moriya | F02D 41/18 123/435 |
| 2007/0157604 A1* | 7/2007 | Kakuya | F02D 13/0261 60/285 |
| 2008/0006236 A1* | 1/2008 | Yamashita | F02D 41/021 123/198 R |
| 2008/0066718 A1* | 3/2008 | Sato | F02D 9/02 123/350 |
| 2009/0030588 A1* | 1/2009 | Yamashita | F02D 41/222 701/103 |
| 2010/0018187 A1* | 1/2010 | Matsumoto | F02D 41/0275 60/286 |
| 2010/0198485 A1* | 8/2010 | Ohtsuka | F02D 11/105 701/103 |
| 2017/0002763 A1* | 1/2017 | Oono | F02D 41/26 |
| 2020/0200100 A1* | 6/2020 | Shi | F02M 26/06 |
| 2020/0291914 A1* | 9/2020 | Shimada | F02P 5/06 |

FOREIGN PATENT DOCUMENTS

| | | | | |
|---|---|---|---|---|
| JP | 2002-221068 A | | 8/2002 | |
| JP | 2006138300 A | * | 6/2006 | ............ F02D 37/02 |
| JP | 2007-198157 A | | 8/2007 | |
| JP | 2010216401 A | * | 9/2010 | ......... F02D 41/0002 |
| WO | WO-9322550 A1 | * | 11/1993 | ............. F02D 41/16 |

OTHER PUBLICATIONS

Japanese-language Written Opinion (PCT/ISA/237) issued in PCT Application No. PCT/JP2019/041031 dated Feb. 10, 2020 with English translation (three (3) pages).

* cited by examiner

ENGINE CONTROL DEVICE AND ENGINE CONTROL METHOD

TECHNICAL FIELD

The present invention relates to an engine control device and an engine control method for performing torque-based (torque demand) type engine control.

BACKGROUND ART

Torque-based (torque demand) engine control has been put into practical use as one of the control methods for an engine having an electronically controlled throttle (hereinafter abbreviated as "electronic control throttle"). The torque-based engine control is a control method capable of performing throttle control, fuel control, ignition control, and the like so as to calculate target torque of the engine based on an accelerator opening and an engine speed to achieve both the target torque and a target air-fuel ratio.

Torque control in the torque-based engine control includes two types of low response torque control performed via an intake air amount operation represented by an electronic control throttle operation and high response throttle control performed without intake air amount operation represented by ignition retard or fuel cut. Two types of target torque of low response target torque and high response target torque are set for each torque control method.

The basis of torque control is torque control (low response torque control) by the electronic control throttle. In the low response torque control, the target torque to be realized is set as the low response target torque. However, when the target torque changes in a complicated manner at high speed, it is difficult to generate the engine torque in accordance with the target torque by operating only the electronic control throttle due to a delay in the response of an intake air. In a situation where the target torque changes in a complicated manner at high speed, the target torque to be realized is set as the high response target torque, and the low response target torque is set to a value equal to or higher than the high response target torque.

FIG. 1 is a chart illustrating an example of a time change of each torque and an ignition timing correction amount when target torque and estimated torque coincide with each other in a steady state. In this chart, a horizontal axis is represented by time and a vertical axis is represented by torque. Then, in the chart illustrated on an upper side of FIG. 1, examples of low response target torque 11, high response target torque 12, and estimated torque 13 are illustrated.

In the present specification, a period in which the low response target torque (for example, the low response target torque 11) changes by a set value or more within a set time is referred to as "transient". In addition, a period in which the low response target torque (for example, the low response target torque 11) and the estimated torque (for example, the estimated torque 13) coincide with each other is referred to as "steady". Since the torque does not change in the steady state, it is illustrated in ranges 14 and 15 that both the low response target torque 11 and the high response target torque 12 coincide with each other.

With single low response torque control, engine torque that exceeds the target torque is generated. However, this excess actual generated torque is adjusted in the decreasing direction, and the high response torque control such as ignition retard and fuel cut is performed in combination so that the estimated torque 13 coincides with the high response target torque 12. For example, an upper chart of FIG. 1 illustrates that a difference 16 between the target torque and the actually generated torque is generated. Therefore, the estimated torque 13 is corrected to approach the high response target torque 12 by implementing ignition retard or fuel cut for the ignition timing (MBT: Minimum advance for the Best Torque) where the torque is maximized, as the ignition timing correction amount. That is, control of implementing the ignition retard or the fuel cut is performed so as to open the electronic control throttle larger with respect to the target torque to be realized to generate the engine torque that exceeds the target torque, and at the same time eliminate the difference 16 between the target torque and the actual generated torque.

However, at present, since there is no device that directly measures the engine torque, it is necessary to estimate the actual generated torque when the low response torque control is implemented in order to implement both the low response torque control and the high response torque control. The estimated value of the actual generated torque, that is, the estimated torque is represented as the estimated torque 13 in the chart illustrated on the upper side of FIG. 1 as described above. Then, an accuracy of the estimated torque 13 affects an accuracy of torque control in a transient state.

Regarding the estimated torque calculation, for example, the prior art disclosed in PTLs 1 and 2 is known.

PTL 1 discloses a technique for correcting engine torque by correcting ignition timing or the like according to a deviation between target torque and corrected estimation torque.

PTL 2 discloses a technique of having a transient response physical model relating to an intake/exhaust system component of an engine and calculating an engine torque estimated value using the transient response physical model.

CITATION LIST

Patent Literature

PTL 1: JP 2002-221068 A
PTL 2: JP 2007-198157 A

SUMMARY OF INVENTION

Technical Problem

In the technique disclosed in PTL 1 described above, the estimated torque is calculated by paying attention to the fact that a correlation between an actual air filling amount and the generated engine torque is very high.

FIG. 2 is an explanatory diagram illustrating an example of an estimated torque map 20 for calculating the estimated torque.

For example, in the estimated torque map 20 provided as an example of a conversion map, an engine speed and an actual air filling amount measured by an air flow sensor are input. Then, the estimated torque map 20 can output the estimated torque by the calculation of converting the input engine speed and actual air filling amount into the engine torque.

However, it has been found that when the technique disclosed in PTL 1 is applied to the above-mentioned low response torque control and high response torque control, the following problems occur. Immediately after the estimated torque map 20 is ideally adapted, as illustrated in FIG. 1, regarding the relationship between the target torque and the estimated torque, there is no deviation between the target torque and the estimated torque in the steady state, and desired torque control can be realized.

However, in reality, the relationship between the target torque and the estimated torque may change as illustrated in FIG. 3 due to an adaptation error of the estimated torque map 20 or individual variation, environmental change, and the like of the engine control system.

FIG. 3 is a chart illustrating an example of a time change of the target torque and the estimated torque and an ignition timing correction amount when the deviation occurs in the steady state. As illustrated in an upper chart of FIG. 3, when a deviation occurs between the low response target torque 11 and the high response target torque 12 and the estimated torque 17 even in the steady state, there is a possibility that the ignition retard or the fuel cut is implemented at all times as illustrated by a difference 18 in a lower chart of FIG. 3. As a result, defects such as a deterioration of fuel efficiency, an increase in an exhaust temperature, and a torque fluctuation are caused.

With respect to such a problem, in the technique illustrated in PTL 1, the estimated torque must be corrected so that there is no deviation between the target torque and the estimated torque in the steady state. However, it is not easy to set an estimated torque correction amount, and a desired estimated torque correction cannot always be realized.

In addition, in the technique disclosed in PTL 2, the estimated torque is calculated by performing primary delay processing on the target torque (low response target torque).

FIG. 4 is a block diagram illustrating an example of a primary delay processing unit 21 that performs processing of calculating an estimated torque from a low response target torque. In this technique, the primary delay processing unit 21 outputs the estimated torque by performing the primary delay processing on the input low response target torque using a time constant τ selected from a map stored in a time constant storage unit 22. In the steady state, the low response target torque, which is the input of the primary delay processing unit 21, and the estimated torque, which is the output of the primary delay processing unit 21, coincide with each other.

In the technique disclosed in PTL 2, it has been considered that since the low response target torque and the estimated torque always coincide with each other in the steady state, it is possible to prevent problems such as a deterioration of fuel efficiency and an increase in an exhaust temperature. However, in the technique illustrated in PTL 2, it is necessary to adapt the time constant τ.

FIG. 5 is an explanatory diagram illustrating an example of estimated torque 33 and 35 when the actual generated torque draws a complicated torque trajectory with respect to a low response target torque 31.

For example, a turbo engine draws a torque trajectory in which the actual generated torque is complicated with respect to the low response target torque 31 in a transient state. In this case, as illustrated in an upper chart of FIG. 5, a turbo lag 32 cannot be expressed by adaptation using only one time constant τ, and an estimated torque 33 illustrated by a broken line and an actually generated torque 34 deviate from each other.

Therefore, as illustrated in a lower chart of FIG. 5, it is necessary to consider an influence of the turbo lag by increasing the number of time constants τ. The lower chart illustrates an example in which the number of time constants τ is increased from 1 to 3 of τ1 to τ3. As the number of time constants τ increases, the estimated torque 35 approaches the actually generated torque 34. However, as the number of time constants τ required for adaptation increases, the man-hours required to adapt τ increase, and a map creation, that is, an adaptation work time increases.

The present invention has been made in view of such a situation, and an object of the present invention is to make it possible to apply torque-based engine control to an engine that draws a complicated torque trajectory.

Solution to Problem

An engine control device according to the present invention includes a target torque calculation unit that calculates target torque of an engine for which torque-based engine control is performed using an estimated torque; and an estimated torque calculation unit that calculates the estimated torque by performing primary delay processing on the target torque using a primary delay coefficient equivalent to a time constant calculated for each control cycle based on a change in an actual intake air amount with respect to a target intake air amount of air sucked into the engine.

Advantageous Effects of Invention

According to the present invention, for example, torque-based engine control that can be applied to an engine that draws a complicated torque trajectory in a transient state such as a turbo engine and does not require adaptation of a time constant can be realized.

The problems, configurations, and effects other than those described above are clarified from the description of the following embodiments.

DESCRIPTION OF EMBODIMENTS

Figure 1:
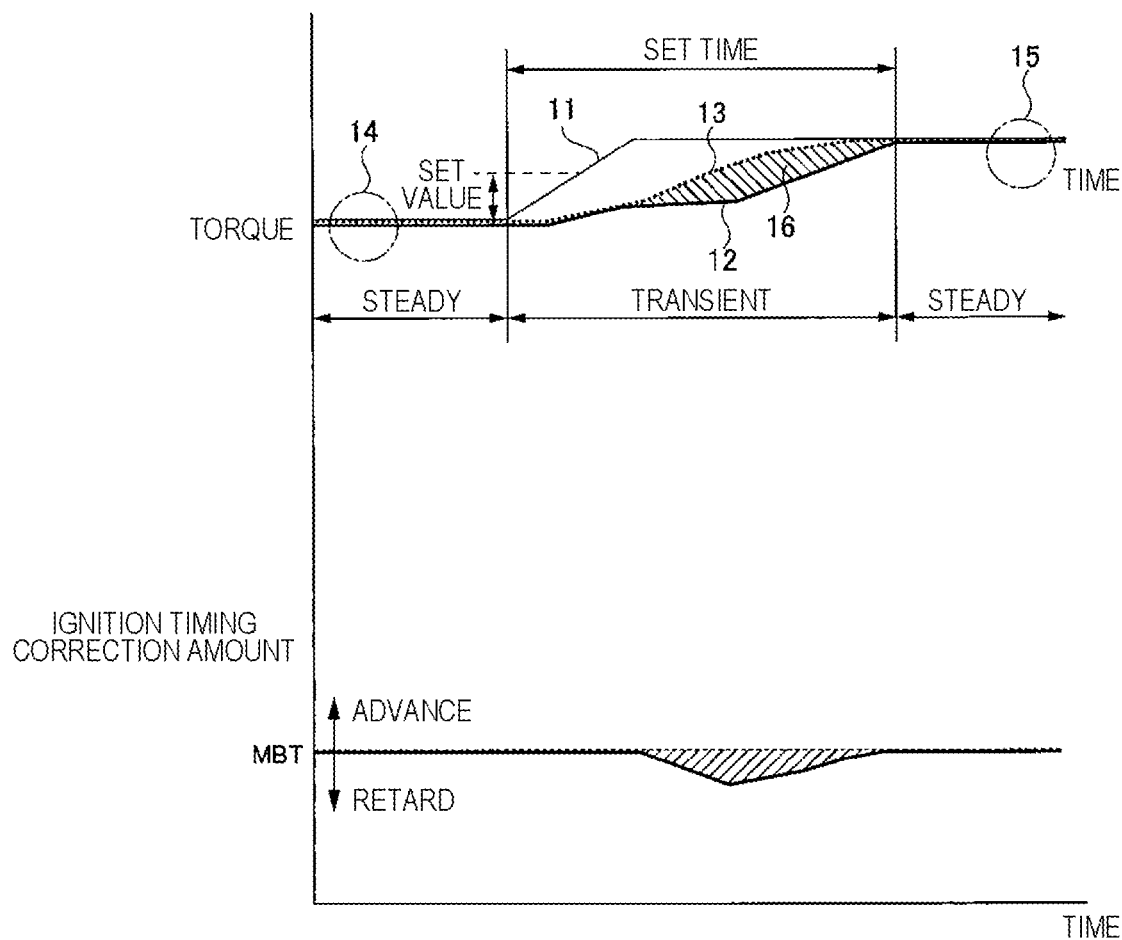
FIG. 1 is a chart illustrating an example of a time change of each torque and an ignition timing correction amount when a target torque and an estimated torque coincide with each other in a steady state.
Figure 2:
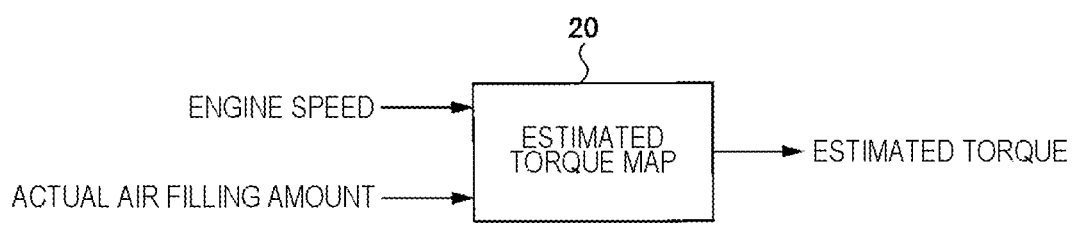
FIG. 2 is an explanatory diagram illustrating an example of an estimated torque map for calculating the estimated torque.
Figure 3:
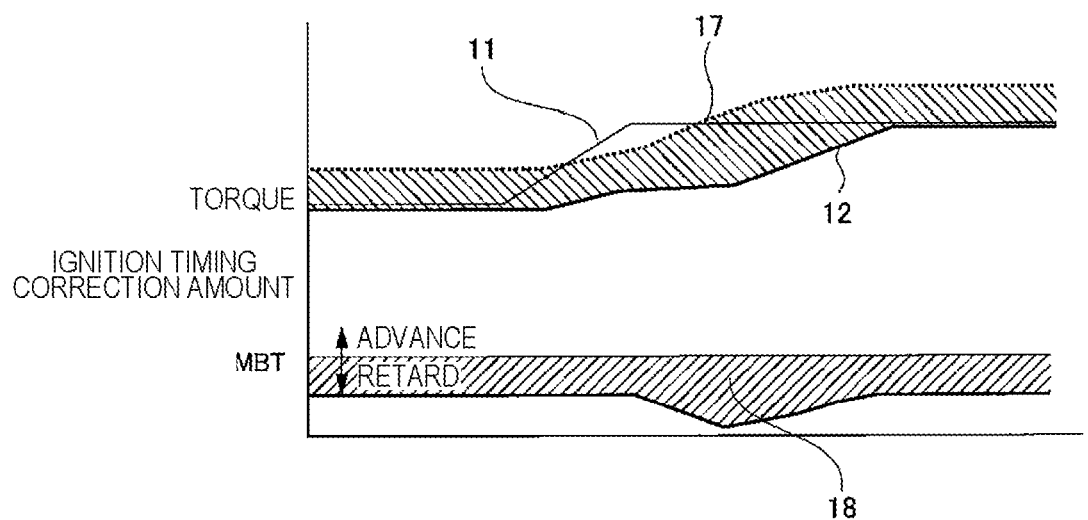
FIG. 3 is a chart illustrating an example of a time change of the target torque and the estimated torque and an ignition timing correction amount when the deviation occurs in the steady state.
Figure 4:
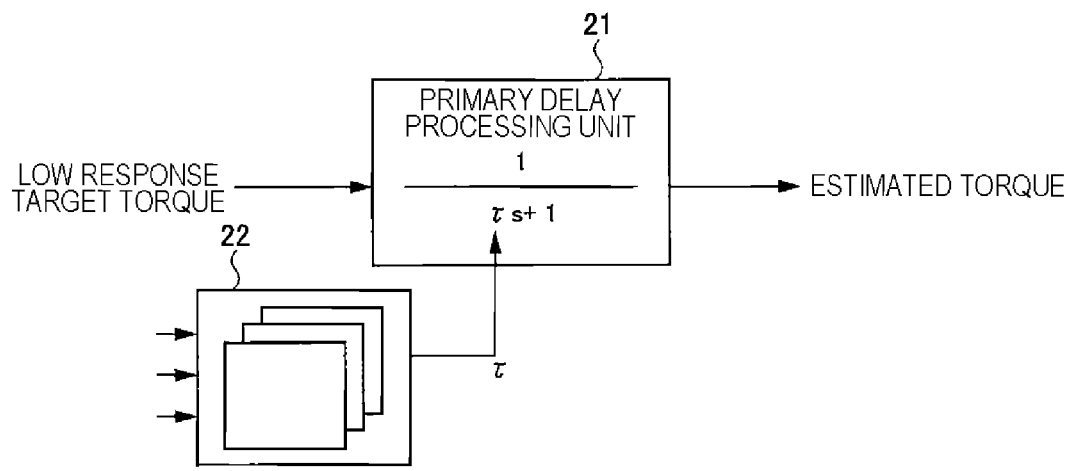
FIG. 4 is a block diagram illustrating an example of a primary delay processing unit that performs processing of calculating an estimated torque from a low response target torque.
Figure 5:
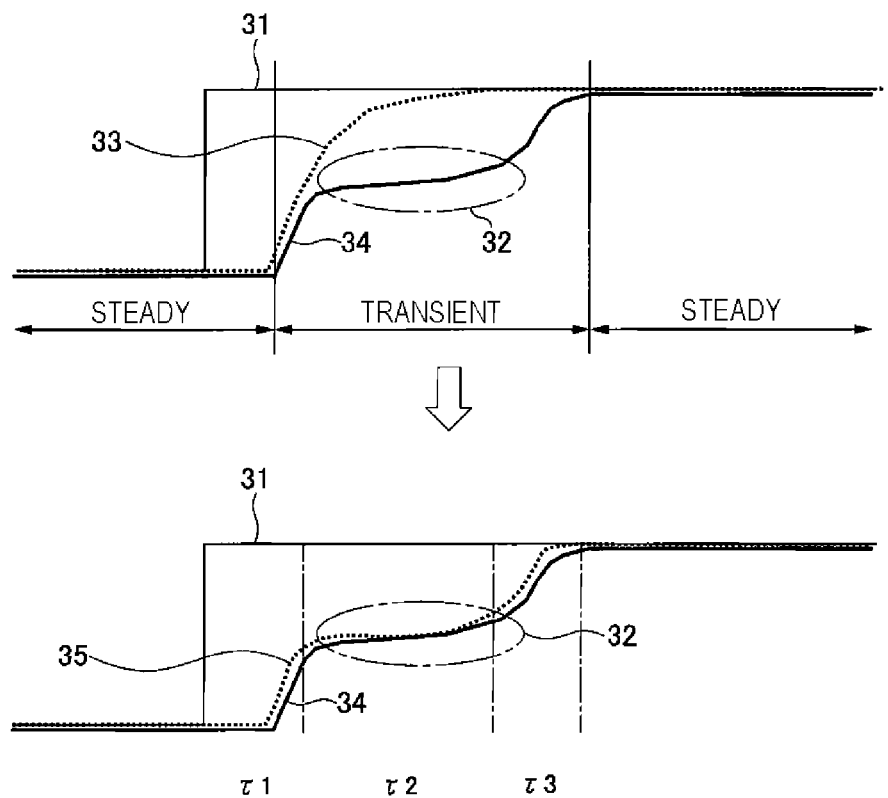
FIG. 5 is an explanatory diagram illustrating an example of estimated torque when a complicated torque trajectory is drawn with respect to a low response target torque.

Hereinafter, embodiments for carrying out the present invention will be described with reference to the accompanying drawings. In the present specification and the drawings, components having substantially the same function or configuration are designated by the same reference numerals, and thus, redundant description will be omitted.

First Embodiment

Figure 6:
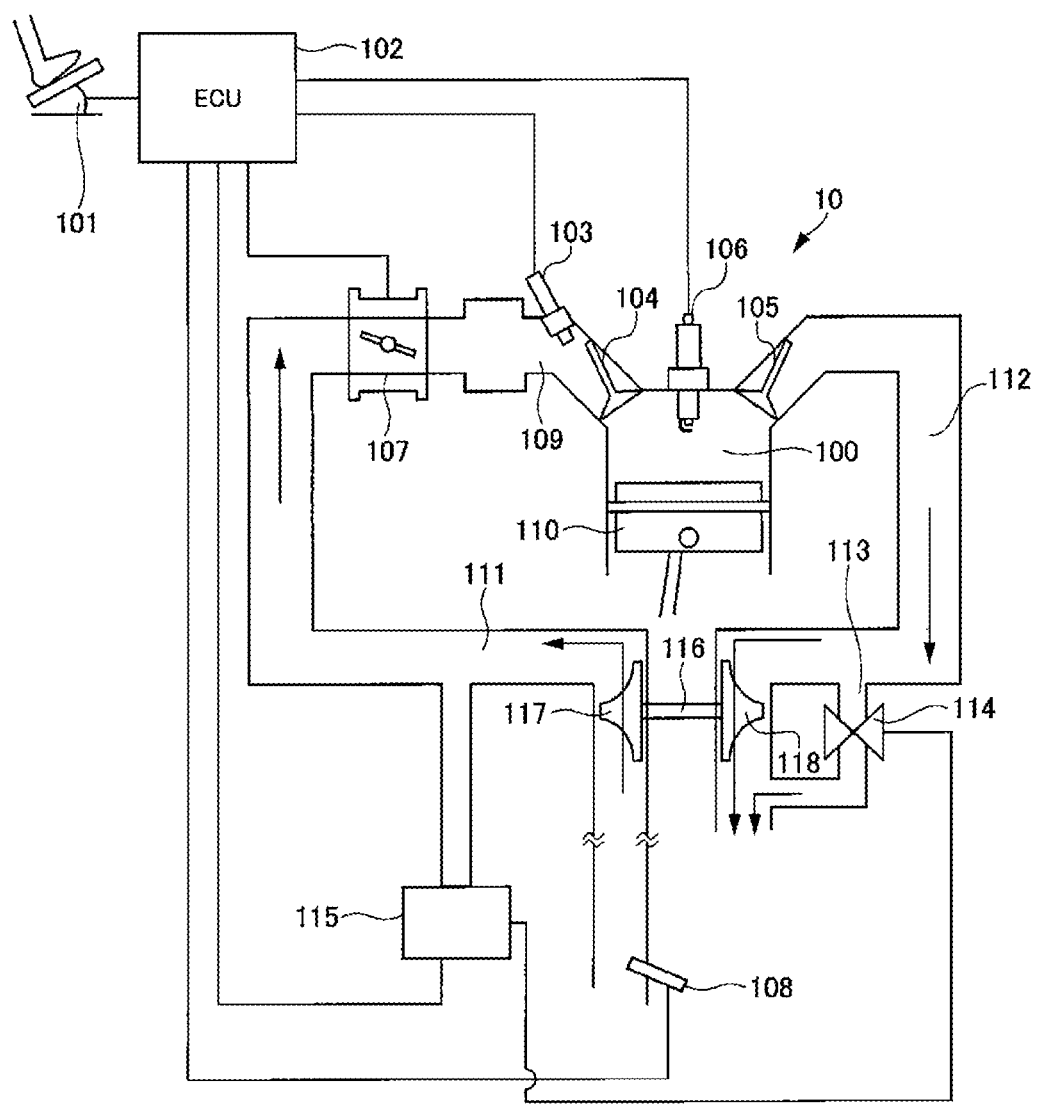
FIG. 6 is a schematic view illustrating a hardware configuration example of a torque-based engine system compatible with a turbo engine to which an engine control device is applied according to a first embodiment of the present invention.

FIG. 6 is a schematic view illustrating a hardware configuration example of a torque-based engine system 1 compatible with a turbo engine to which an engine control device is applied according to a first embodiment. Hereinafter, a configuration example of the turbo engine compatible with the torque-based engine system 1 and a method of controlling an engine 10 (engine control method) will be described.

An engine 10 (an example of an internal combustion engine) is a turbocharged engine having a turbocharger 116. The engine (engine 10) performs torque-based engine control using the estimated torque. The estimated torque used in the torque-based engine control is calculated by an engine control unit (ECU) 102. An intake system of the engine 10 is provided with a compressor 117, which is a component of the turbocharger 116. An intake air compressed by the compressor 117 passes through an intake pipe 111 and is introduced to an inlet side of an electronic control throttle 107.

The electronic control throttle 107 determines a throttle opening by a signal calculated by the ECU 102 based on opening information of the accelerator pedal 101 operated by a driver, and adjusts an intake air amount introduced into an intake manifold 109 according to the opening. The ECU 102 is an example of an engine control device.

In a process of adjusting the intake air amount, the air flow sensor 108 provided in front of the compressor 117 measures an actual intake air amount of the air sucked into a cylinder of the engine 10. Then, a measurement signal of the actual intake air amount is transmitted from the air flow sensor 108 to the ECU 102.

The ECU 102 is a computer type, and is configured by, for example, a central processing unit (CPU), a read only memory (ROM), a random access memory (RAM), and the like. Each function of ECU 102 is realized by executing a program code read from the ROM by the CPU. Various values, parameters, and the like in the middle of processing are temporarily stored in the RAM, and are appropriately read from RAM and used for processing. The ROM in which the program code is stored is, for example, an example of a non-transient storage medium that can be read by a computer.

Based on the actual intake air amount measured by the air flow sensor 108 and the engine speed obtained from an output signal of a crank angle sensor (not illustrated), the ECU 102 calculates an appropriate fuel injection amount and fuel injection timing in order to realize a target air-fuel ratio.

The intake manifold 109 is provided with an injector 103 (an example of a fuel injection valve). The injector 103 injects fuel in accordance with a fuel injection command output by the ECU 102. The fuel injected from the injector 103 and the intake air form an air-fuel mixture of fuel and air in the intake manifold 109. The air-fuel mixture is introduced into a combustion chamber 100 from the moment at which a piston 110 provided for each cylinder of the engine 10 descends and an intake valve 104 opens.

Thereafter, the intake valve 104 is closed, and the air-fuel mixture compressed in the process of ascending the piston 110 is ignited by a spark plug 106 in the vicinity immediately before a compression top dead center. The ignited air-fuel mixture expands rapidly and pushes down the piston 110 to generate engine torque.

Thereafter, an exhaust stroke starts from the moment at which the piston 110 rises and the exhaust valve 105 opens, and an exhaust gas from the combustion chamber 100 is discharged to an exhaust pipe 112. A turbine 118, which is a component of the turbocharger 116, is attached to the exhaust pipe 112. The turbine 118 is rotationally driven by energy of the exhaust gas flowing through the exhaust pipe 112 to synchronously rotate the coaxial compressor 117.

The torque-based engine system 1 compatible with a turbo engine obtains a supercharging effect by rotating the turbine 118 and the compressor 117 of the turbocharger 116 using the energy of the exhaust gas. The supercharging effect depends on the amount of exhaust gas.

Note that if the turbine 118 rotates excessively, the intake pressure exceeds a set value, and the engine 10 may be damaged by an excessive load. To prevent this, when the intake pressure exceeds the set value, a wastegate valve control unit 115 controls an open/close duty ratio of a wastegate valve 114 and bypasses a portion of the exhaust gas in a direction of a wastegate 113, and adjusts a turbine rotation. As a result, the intake pressure is controlled so as not to exceed the set value. The wastegate valve control unit 115 is a computer type and is capable of bidirectional communication with the ECU 102.

Next, a control system of the torque-based engine system 1 compatible with the turbo engine will be described with reference to FIG. 7.

Figure 7:
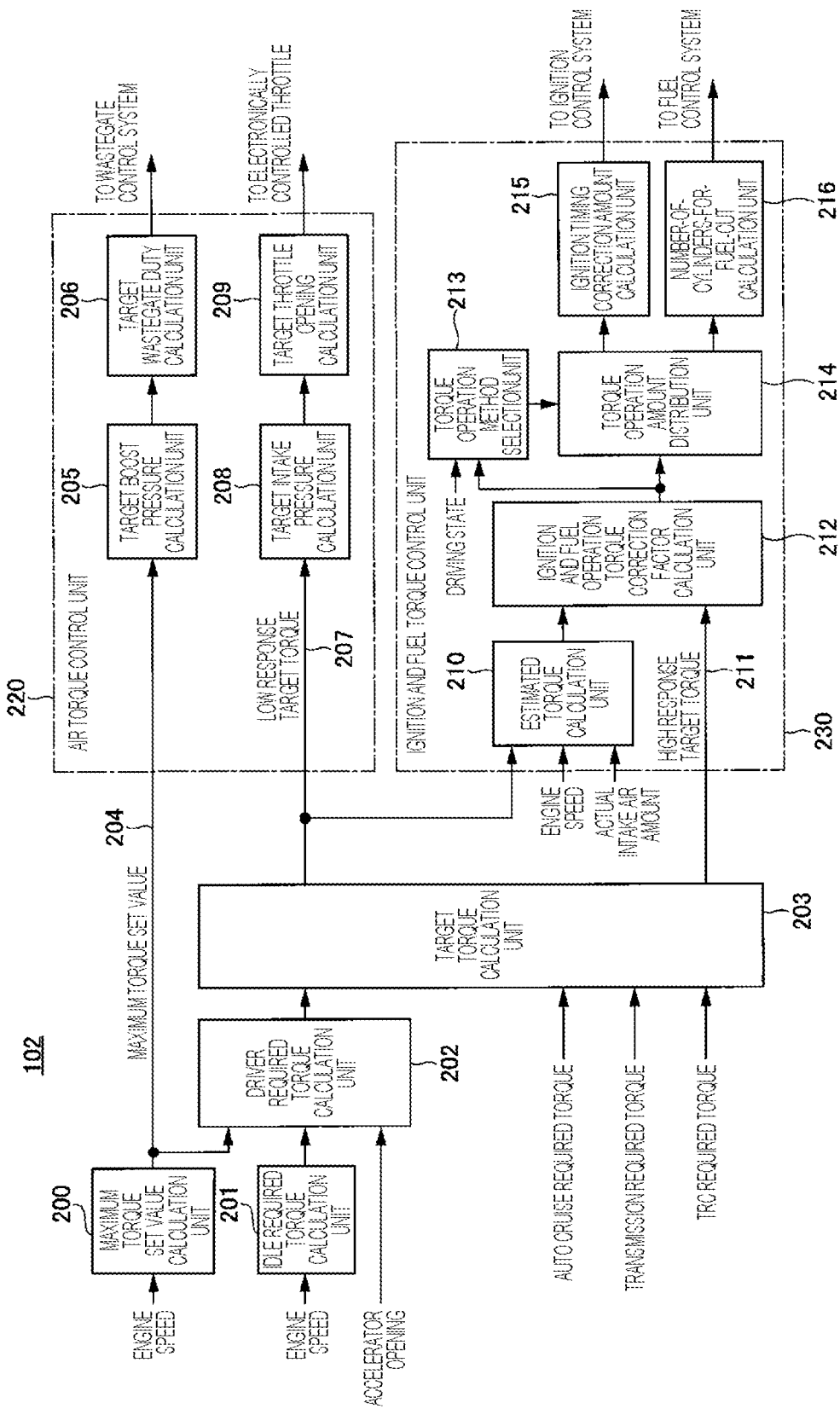
FIG. 7 is a functional block diagram illustrating a configuration example of a control system of the torque-based engine system compatible with the turbo engine according to the first embodiment of the present invention.

FIG. 7 is a functional block diagram illustrating a configuration example of a control system of the torque-based engine system 1 compatible with the turbo engine.

The engine control device (ECU 102) includes a maximum torque set value calculation unit 200, an idle required torque calculation unit 201, a driver required torque calculation unit 202, a target torque calculation unit (target torque calculation unit 203), an air torque control unit 220, and an ignition and fuel torque control unit 230. The ignition and fuel torque control unit 230 includes an estimated torque calculation unit (estimated torque calculation unit 210).

The maximum torque set value calculation unit 200 calculates a maximum torque set value at an engine speed (speed of the engine 10) at that time based on an input engine speed signal.

The idle required torque calculation unit 201 calculates a torque required to maintain a target idle speed based on the input engine speed signal.

The driver required torque calculation unit 202 calculates an engine torque required by a driver based on an accelerator opening obtained from an accelerator opening signal, a maximum torque set value calculated by the maximum torque set value calculation unit 200, and an idle required torque calculated by the idle required torque calculation unit 201.

The target torque calculation unit (target torque calculation unit 203) calculates target torque of the engine (engine 10) for which the torque-based engine control is performed using the estimated torque. The target torque calculation unit 203 takes in the required torque from an external system such as an auto cruise required torque, a transmission required torque, and a TRaction Control (TRC) required torque in addition to the driver required torque calculated by the driver required torque calculation unit 202 and determines a final target torque (engine torque target value) in consideration of the respective priorities.

The target torque calculated by the target torque calculation unit 203 is separated into a low response target torque 207 and a high response target torque 211. Then, the low response target torque 207 is transmitted to the air torque control unit 220 that forms a low response torque control path. The high response target torque 211 is transmitted to the ignition and fuel torque control unit 230 that forms a high response torque control path.

The air torque control unit 220 includes a target boost pressure calculation unit 205, a target wastegate duty calculation unit 206, a target intake pressure calculation unit 208, and a target throttle opening calculation unit 209.

The target boost pressure calculation unit 205 calculates a target boost pressure corresponding to the maximum torque set value 204 calculated by the maximum torque set value calculation unit 200.

The target wastegate duty calculation unit 206 calculates a target wastegate duty required to realize the target boost pressure calculated by the target boost pressure calculation unit 205, and transmits the calculation result to a wastegate valve control unit 115 (wastegate control system).

The target intake pressure calculation unit 208 calculates a target intake pressure required to realize the low response target torque 207.

The target throttle opening calculation unit 209 calculates a target throttle opening required to realize the target intake pressure calculated by the target intake pressure calculation unit 208, and transmits the calculation result to the electronic control throttle 107.

Next, the ignition and fuel torque control unit 230 used when a torque trajectory that changes at high speed is required from an external device such as traction control will be described.

The ignition and fuel torque control unit 230 includes an estimated torque calculation unit 210, an ignition and fuel operation torque correction factor calculation unit 212, a torque operation method selection unit 213, a torque operation amount distribution unit 214, an ignition timing correction amount calculation unit 215, and a fuel cut cylinder number calculation unit 216.

The estimated torque calculation unit 210 estimates the engine torque (actually generated torque) actually generated during engine torque control as the estimated torque, and calculates estimated torque (engine torque estimated value) that is an index when performing a torque operation by ignition and fuel. Specifically, the estimated torque calculation unit 210 calculates the estimated torque that estimates the actual generated torque when it is assumed that the low response torque control by the throttle and the turbocharger is performed. In the present embodiment, the estimated torque calculation unit (estimated torque calculation unit 210) calculates a primary delay coefficient (primary delay coefficient 304 illustrated in FIG. 8 described later) equivalent to a time constant (time constant $\tau$) calculated for each control cycle based on a change in the actual intake air amount with respect to the target intake air amount of the air sucked into the engine (engine 10), and calculates the estimated torque by performing primary delay processing on the target torque based on the primary delay coefficient (primary delay coefficient 304).

The ignition and fuel operation torque correction factor calculation unit 212 calculates an ignition and fuel operation torque correction factor, which is an index for torque operation by ignition and fuel. At this time, the ignition and fuel operation torque correction factor calculation unit 212 calculates a ratio between the estimated torque calculated by the estimated torque calculation unit 210 and the high response target torque 211 input from the target torque calculation unit 203.

The torque operation method selection unit 213 selects an appropriate torque operation method based on an input driving state and the ignition and fuel operation torque correction factor calculated by the ignition and fuel operation torque correction factor calculation unit 212. The torque operation method includes ignition timing correction or fuel cut, and each correction method is selected individually or in combination.

The torque operation amount distribution unit 214 distributes a torque operation amount to the ignition timing correction amount calculation unit 215 and the fuel cut cylinder number calculation unit 216 based on the ignition and fuel operation torque correction factor calculated by the ignition and fuel torque correction factor calculation unit 212 and the torque operation method selected by the torque operation method selection unit 213.

The ignition timing correction amount calculation unit 215 calculates an ignition timing correction amount based on the distributed torque correction factor. Therefore, the ignition timing correction amount calculation unit 215 is an example of an ignition timing correction unit that corrects the ignition timing for igniting the fuel injected into the cylinder of the engine 10 so that the estimated torque becomes the high response target torque 211.

The fuel cut cylinder number calculation unit 216 calculates the number of fuel cut cylinders based on the distributed torque correction factor. Therefore, the fuel cut cylinder number calculation unit 216 is used as an example of the fuel cut control unit that performs fuel cut for the cylinders of the engine 10 so that the estimated torque becomes the high response target torque 211.

The ignition timing correction amount calculated by the ignition timing correction amount calculation unit 215 is reflected in the control of the ignition control system, and the number of fuel cut cylinders calculated by the fuel cut cylinder number calculation unit 216 is reflected in the control of the fuel control system. Therefore, it is possible to realize a desired engine torque even in the transient state.

Figure 8:
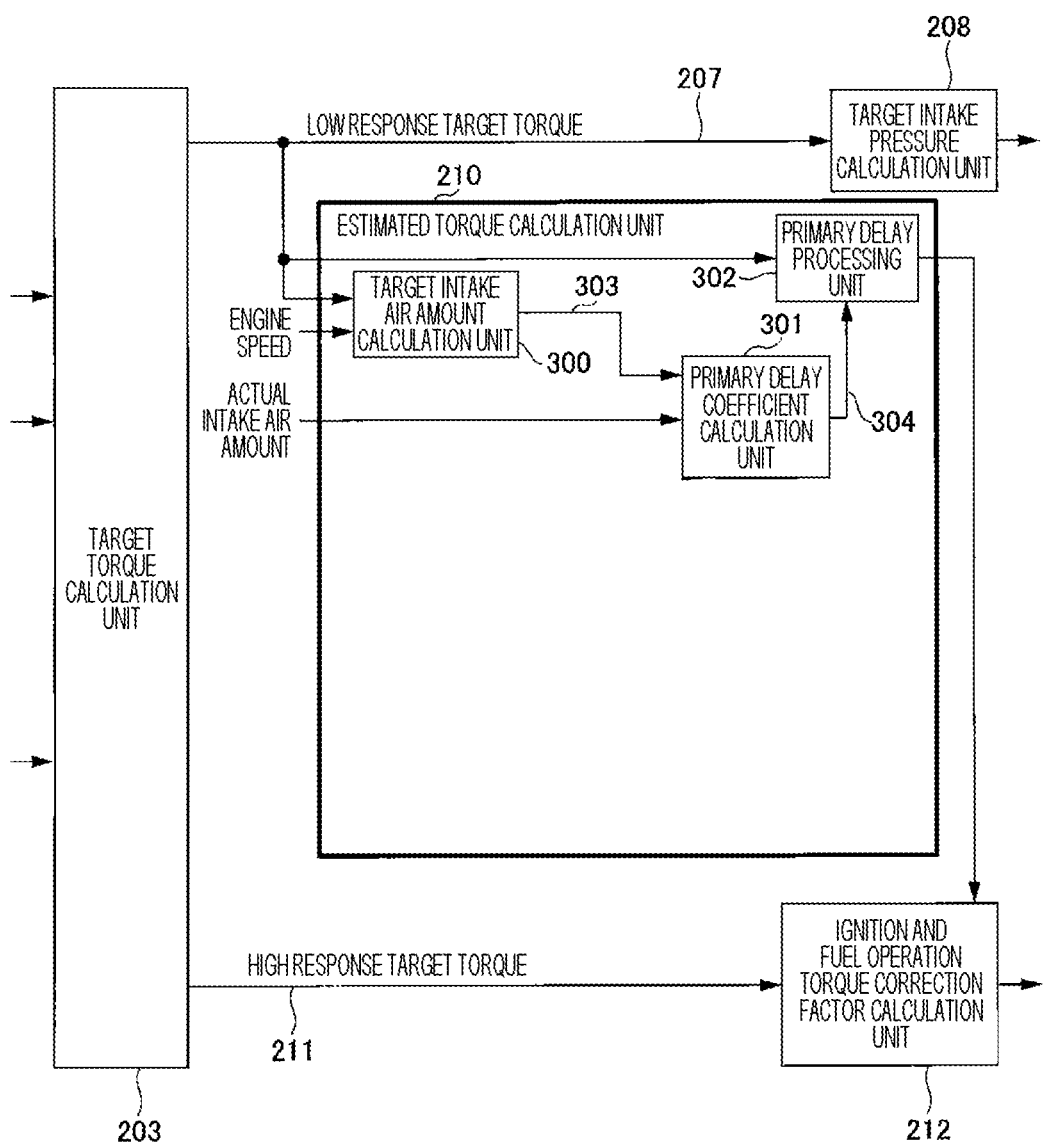
FIG. 8 is a functional block diagram illustrating a configuration example of an estimated torque calculation unit according to the first embodiment of the present invention.

Next, a configuration example and an operation example of the estimated torque calculation unit 210 according to the first embodiment will be described with reference to FIGS. 8 and 9. FIG. 8 is a functional block diagram illustrating a configuration example of the estimated torque calculation unit 210.

The estimated torque calculation unit (estimated torque calculation unit 210) includes a target intake air amount calculation unit (target intake air amount calculation unit 300), a primary delay coefficient calculation unit (primary delay coefficient calculation unit 301), and a primary delay processing unit (primary delay processing unit 302).

The target intake air amount calculation unit 300 has a data table (not illustrated) of the target intake air amount with the low response target torque 207 input from the target torque calculation unit 203 and the engine speed as arguments. Then, the target intake air amount calculation unit (target intake air amount calculation unit 300) refers to the data table of the target intake air amount, and calculates the target intake air amount (target intake air amount 303) based on the target torque (low response target torque 207) input from the target torque calculation unit (target torque calculation unit 203) and the speed of the engine (engine 10).

The primary delay coefficient calculation unit (primary delay coefficient calculation unit 301) calculates a primary delay coefficient equivalent to a time constant (time constant τ) calculated for each control cycle based on the target intake air amount (target intake air amount 303) and the actual intake air amount. The calculated time constant τ is output to the primary delay processing unit 302 as a primary delay coefficient 304. Here, the primary delay coefficient calculation unit 301 calculates the time constant τ and the primary delay coefficient 304 in the transient state in which the target torque changes by a set value or more within a set time. That is, the primary delay coefficient calculation unit (primary delay coefficient calculation unit 301) can calculate the primary delay coefficient (primary delay coefficient 304) when the actual intake air amount changes by the set value or more within the set time.

Then, the primary delay processing unit (primary delay processing unit 302) calculates the estimated torque by performing the primary delay processing for the target torque (low response target torque 207) based on the target torque (low response target torque 207) and the primary delay coefficient (primary delay coefficient 304). Here, the primary delay processing unit (primary delay processing unit 302) calculates the estimated torque by performing the primary delay processing for the target torque (low response target torque 207) using the primary delay coefficient (primary delay coefficient 304) calculated in the transient state in which the target torque (low response target torque 207) changes by the set value or more within the set time. In addition, the primary delay processing unit (primary delay processing unit 302) can calculate the target torque (low response target torque 207) as the estimated torque in the steady state when the target intake air amount and the actual intake air amount coincide with each other.

Here, the calculation content of the primary delay coefficient calculation unit 301 will be described.

Figure 9:
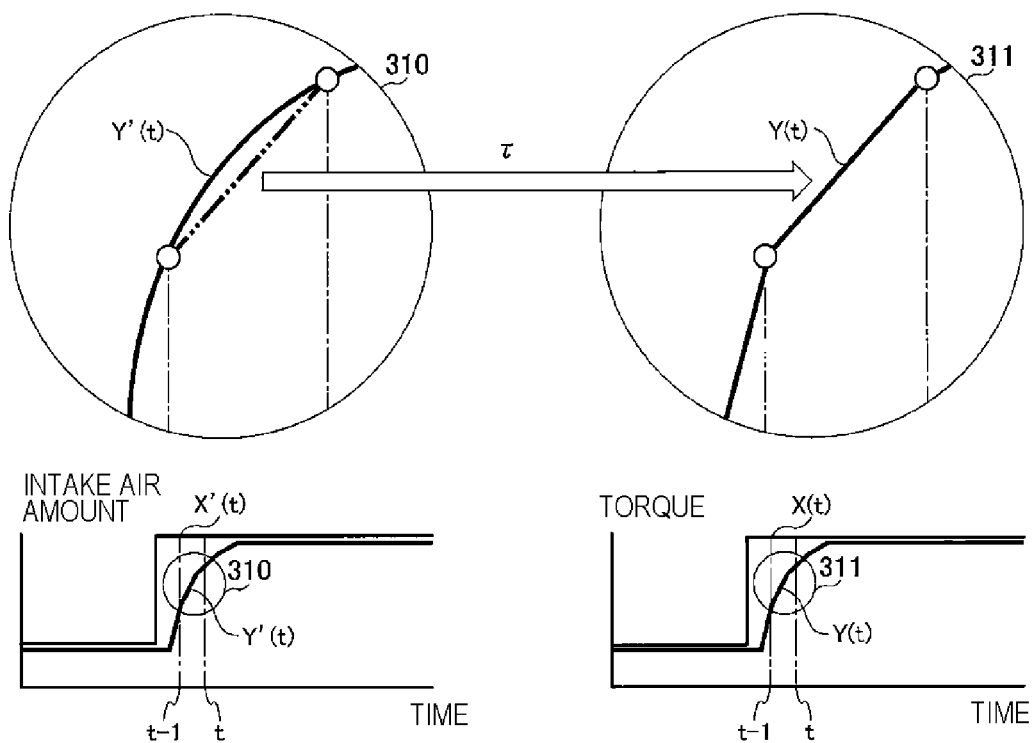
FIG. 9 is an explanatory diagram illustrating an example of calculation content of a primary delay coefficient calculation unit according to the first embodiment of the present invention.

FIG. 9 is an explanatory diagram illustrating an example of calculation content of the primary delay coefficient calculation unit 301. In the chart illustrated in FIG. 9, a horizontal axis is represented by time and a vertical axis is represented by the intake air amount.

The upper chart of FIG. 9 illustrates a relationship between a target intake air amount X' (t) and an actual intake air amount Y'(t). A lower portion of the upper chart in FIG. 9 illustrates an aspect of the transient state in which the actual intake air amount Y' (t) approaches the target intake air amount X' (t), and an upper portion of the upper chart illustrates an enlarged view of the range 310 representing an aspect of the actual intake air amount Y' (t) in the transient state. The target intake air amount X' (t) is a value calculated by the target intake air amount calculation unit 300, and corresponds to the target intake air amount 303 illustrated in FIG. 8. The actual intake air amount Y'(t) is a value measured by the air flow sensor 108 illustrated in FIG. 6.

As illustrated in the following equation (1), the primary delay coefficient calculation unit 301 calculates a primary delay coefficient α regarding the intake air amount from the target intake air amount X' (t) and the actual intake air amount Y'(t) for each control cycle.

[Equation 1]

$$\alpha = \frac{Y'(t) - Y'(t-1)}{X'(t) - Y'(t-1)} \quad (1)$$

In the following description, a physical quantity at time t is referred to as "current value", and a physical quantity at time t−1 is referred to as "previous value". For example, in Equation (1), the primary delay coefficient α is calculated based on a current value X' (t) of the target intake air amount, a current value Y' (t) of the actual intake air amount, and a previous value Y' (t−1) of the actual intake air amount. The primary delay coefficient α corresponds to the primary delay coefficient 304 illustrated in FIG. 8.

The lower chart in FIG. 9 illustrates a relationship between the low response target torque X (t) and the estimated torque Y (t). A lower portion of the lower chart in FIG. 9 illustrates an aspect of the transient state in which estimated torque Y(t) approaches a low response target torque X (t), and an upper portion of the lower chart illustrates an enlarged view of the range 311 representing an aspect of the estimated torque Y(t) in the transient state.

When the primary delay coefficient α is calculated by the primary delay coefficient calculation unit 301 as described with reference to the upper chart in FIG. 9, the estimated torque Y(t) is calculated using this primary delay coefficient α. Therefore, as illustrated in the following equation (2), the primary delay processing unit 302 calculates a current value Y(t) of the estimated torque for each control cycle based on the primary delay coefficient α calculated by Equation (1), the low response target torque X(t), and the previous value Y(t−1) of the estimated torque.

$$Y(t) = \alpha X(t) + (1 - \alpha)Y(t - 1) \quad \text{[Equation 2]}$$

As described above, the primary delay coefficient α calculated by Equation (1) and used in Equation (2) is expressed as the primary delay coefficient 304 calculated by the primary delay coefficient calculation unit 301 and output to the primary delay processing unit 302, as illustrated in FIG. 8. The primary delay coefficient 304 is a value expressing an aspect of change in the actual intake air amount. Then, the primary delay coefficient α is a value obtained by discretizing the time constant τ with a control cycle ΔT, as illustrated in the following equation (3). Calculating the primary delay coefficient α and using it for the calculation of the estimated torque Y(t) is equivalent to calculating the time constant τ and using it for the calculation of the estimated torque Y(t).

[Equation 3]
$$\alpha = \frac{\Delta T}{\tau + \Delta T} \quad (3)$$

The ECU 102 according to the present embodiment includes the estimated torque calculation unit 210 as illustrated in FIG. 7. The estimated torque calculation unit 210 calculates the primary delay coefficient 304 used for the primary delay processing based on the change in the actual intake air amount of the air sucked into the engine 10 in the primary delay coefficient calculation unit 301. Then, the estimated torque calculation unit 210 can calculate the estimated torque by performing the primary delay processing by the primary delay processing unit 302 based on the low response target torque 207 and the primary delay coefficient 304.

Here, as illustrated in FIG. 1, the estimated torque calculation unit 210 can calculate the estimated torque by performing the primary delay processing on the low response target torque 207 calculated by the target torque calculation unit 203 when the low response target torque 207 changes by the set value or more within the set time. Here, when the low response target torque 207 changes by the set value or more within the set time, it means that the low response target torque 207 is no longer in the steady state. Then, the estimated torque calculation unit 210 calculates the primary delay coefficient 304 used for primary delay processing based on the change in the actual intake air amount of the air sucked into the engine 10 when the low response target torque 207 changes by the set value or more within the set time or in the transient period. Then, the primary delay processing unit 302 can calculate the estimated torque using the primary delay coefficient 304.

The ignition timing correction unit (ignition timing correction amount calculation unit 215) corrects the ignition timing for igniting the fuel injected into the cylinder of the engine (engine 10) so that the estimated torque becomes the target torque (high response target torque 211). By correcting the ignition timing, it is possible to increase or decrease the estimated torque.

In addition, the fuel cut control unit (fuel cut cylinder number calculation unit 216) performs fuel cut for the cylinders of the engine (engine 10) so that the estimated torque becomes the target torque (high response target torque 211). For example, the torque can be reduced by performing the fuel cut for a specific cylinder among a plurality of cylinders.

In addition, the fuel injection amount control unit (ECU 102) corrects a fuel injection amount of the fuel injection valve (injector 103) that sends fuel to the cylinder of the engine (engine 10) so that the estimated torque becomes the target torque (high response target torque 211). By increasing or decreasing the fuel injection amount, the ECU 102 increases or decreases the estimated torque, and it becomes possible to control the estimated torque to approach the target torque.

The ignition timing correction, the fuel cut, or the fuel injection amount correction is performed, for example, by the ECU 102 alone or in combination.

The estimated torque calculation unit 210 according to the first embodiment described above makes it possible to provide an engine control device (ECU 102) and a control method using torque estimation logic that does not require adaptation of the time constant. At this time, the ECU 102 automatically calculates the primary delay coefficient 304 of the torque based on the change in the actual intake air amount for each control cycle, and calculates the estimated torque by performing the primary delay processing based on the target torque and the primary delay coefficient 304.

Therefore, for example, even when drawing a complicated torque trajectory in the transient state such as the turbo engine, the ECU 102 does not need to increase the number of time constants to adapt the parameters of the primary delay processing. In addition, problems such as a deterioration of fuel efficiency, an increase in an exhaust temperature, and a torque fluctuation due to a deviation between the target torque and the estimated torque in the steady state do not occur. Then, since the ECU 102 can accurately calculate the estimated torque based on the automatically calculated primary delay coefficient 304, appropriate torque-based torque control becomes possible.

Second Embodiment

Next, a configuration example and an operation example of the estimated torque calculation unit according to the second embodiment will be described with reference to FIGS. 10 to 15.

First, an aspect in which the actual intake air amount vibrates in small steps will be described with reference to FIG. 13.

Figure 13:
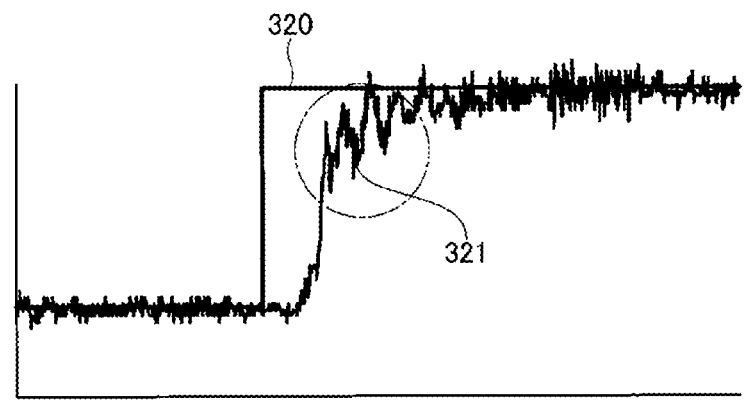
FIG. 13 is an explanatory diagram illustrating an aspect in which an actual intake air amount vibrates with respect to a target intake air amount according to the second embodiment of the present invention.

FIG. 13 is an explanatory diagram illustrating an aspect in which an actual intake air amount 321 vibrates with respect to a target intake air amount 320.

In a transient state in which the actual intake air amount 321 changes toward the target intake air amount 320, the actual intake air amount 321 tends to vibrate as illustrated in FIG. 13. However, if the actual intake air amount 321 used for calculating the primary delay coefficient α is vibrating, the primary delay coefficient α may not be calculated appropriately.

In addition, the primary delay coefficient α calculated by the primary delay coefficient calculation unit 301 according to the first embodiment includes division as illustrated in the above-mentioned equation (1). In the steady since the target intake air amount X' (t) and the actual intake air amount Y' (t) are almost the same value (X' (t)≈Y' (t−1)), and therefore, when a denominator of Equation (1) becomes zero or becomes an extremely small value, mathematical contradiction or divergence of the primary delay coefficient α may occur.

Therefore, the estimated torque calculation unit 210A (FIG. 10) according to the second embodiment has a configuration in which processing for preventing the mathematical contradiction and the divergence in Equation (1) and reducing the vibration of the actual intake air amount is added to the estimated torque calculation unit 210 according to the first embodiment.

A configuration example of the estimated torque calculation unit 210A according to the second embodiment will be described.

Figure 10:
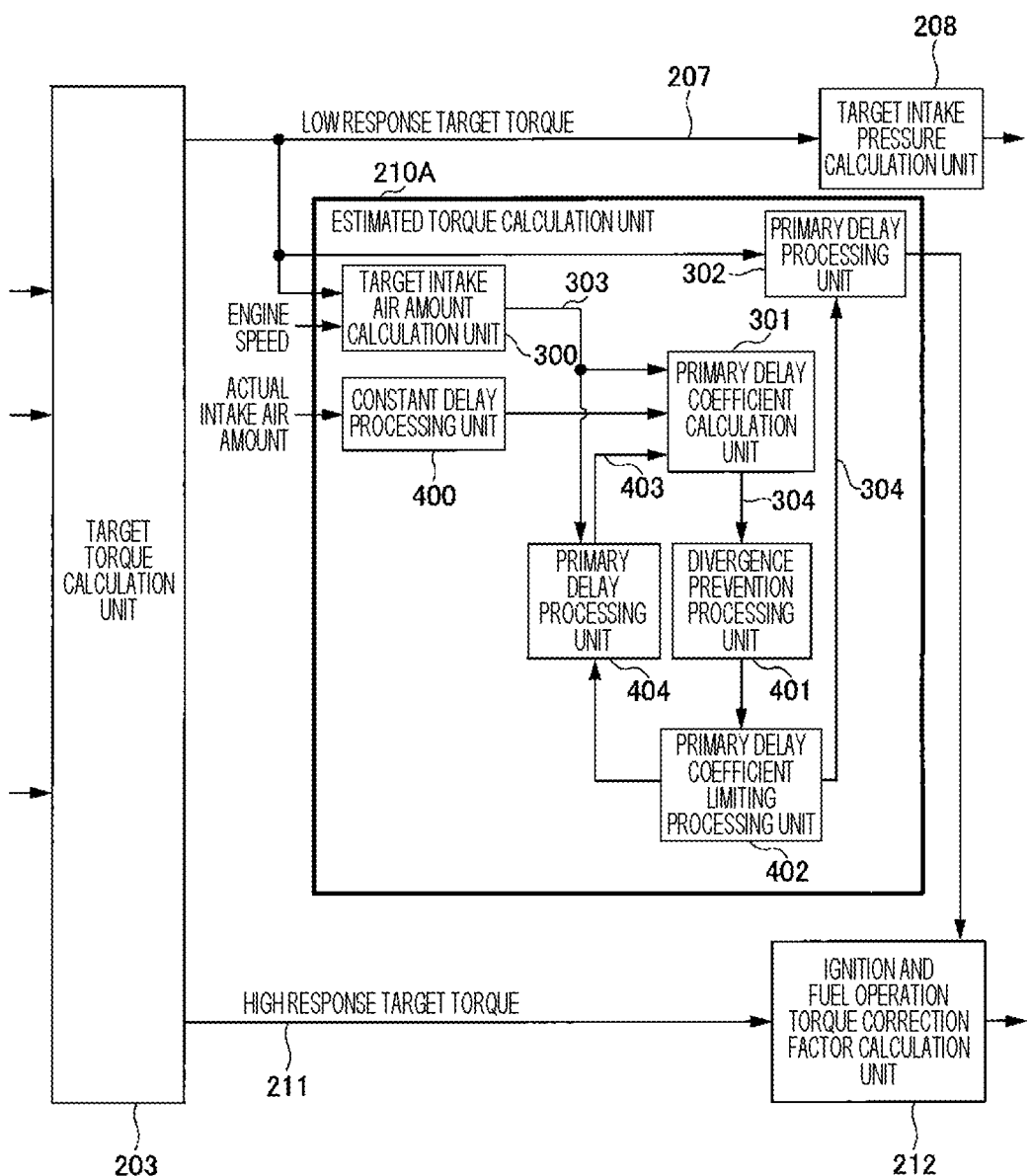
FIG. 10 is a functional block diagram illustrating a configuration example of an estimated torque calculation unit according to a second embodiment of the present invention.

FIG. 10 is a functional block diagram illustrating a configuration example of an estimated torque calculation unit 210A.

The estimated torque calculation unit (estimated torque calculation unit 210A) includes a constant delay processing unit (constant delay processing unit 400), a divergence prevention processing unit (divergence prevention processing unit 401), a primary delay coefficient limiting processing unit (primary delay coefficient limiting processing unit 402), and a second primary delay processing unit (primary delay processing unit 404), in addition to the estimated torque calculation unit 210 according to the first embodiment.

The constant delay processing unit (constant delay processing unit 400) performs filter processing with a delay coefficient as a constant in order to reduce the vibration of the input actual intake air amount. The constant delay processing unit 400 outputs the actual intake air amount with reduced vibration to the primary delay coefficient calculation unit 301.

The primary delay coefficient calculation unit (primary delay coefficient calculation unit 301) calculates the primary delay coefficient (primary delay coefficient 304) based on the target intake air amount (target intake air amount 303), the actual intake air amount on which the filter processing is performed, and the estimated intake air amount (estimated intake air amount 403) input from the second primary delay processing unit (primary delay processing unit 404). Here, to the primary delay coefficient calculation unit 301, the target intake air amount 303 is input from the target intake air amount calculation unit 300, and the actual intake air amount on which the filter processing is performed is input from the constant delay processing unit 400, and a previous value of the estimated intake air amount 403 is input from the primary delay processing unit 404. Then, the primary delay coefficient calculation unit 301 outputs the primary delay coefficient 304 to the divergence prevention processing unit 401.

When the primary delay coefficient (primary delay coefficient 304) diverges in the calculation of the primary delay coefficient (primary delay coefficient 304) performed by the primary delay coefficient calculation unit (primary delay coefficient calculation unit 301), the divergence prevention processing unit (divergence prevention processing unit 401) switches the primary delay coefficient (primary delay coefficient 304) input from the primary delay coefficient calculation unit (primary delay coefficient calculation unit 301) to a different value and prevents the divergence of the primary delay coefficient (primary delay coefficient 304). At this time, the divergence prevention processing unit 401 switches an output of the input primary delay coefficient 304 according to a condition determination illustrated in FIG. 11. For example, depending on the condition determination, the divergence prevention processing unit 401 selects whether the input primary delay coefficient 304 is output as it is or "0" is output to the primary delay coefficient limiting processing unit 402.

The primary delay coefficient limiting processing unit (primary delay coefficient limiting processing unit 402) limits the primary delay coefficient (primary delay coefficient 304) input from the divergence prevention processing unit (divergence prevention processing unit 401) and outputs it the primary delay processing unit (primary delay processing unit 302). At this time, the primary delay coefficient limiting processing unit 402 limits the output by switching the output by the condition determination of whether it is in the steady state and the condition determination of whether the primary delay coefficient 304 input from the divergence prevention processing unit 401 is 0 or more and 1 or less. For example, depending on the condition determination, it is selected whether the primary delay coefficient 304 input from the divergence prevention processing unit 401 is output as it is, or whether "0" or "1" is output. If the primary delay coefficient 304 input from the divergence prevention processing unit 401 is a negative value less than 0, "0" is selected as the output. The output of the primary delay coefficient 304 limited by the primary delay coefficient limiting processing unit 402 is input to the primary delay processing units 302 and 404.

The second primary delay processing unit (primary delay processing unit 404) performs the primary delay processing of the target intake air amount (target intake air amount 303) and calculates the estimated intake air amount of the engine (engine 10), based on the target intake air amount (target intake air amount 303) and the primary delay coefficient (primary delay coefficient 304) limited by the primary delay coefficient limiting processing unit (primary delay coefficient limiting processing unit 402). At this time, the primary delay processing unit 404 performs the primary delay processing of the target intake air amount 303 (target intake air amount X' (t)) by using the target intake air amount 303 and the limited primary delay coefficient 304 as inputs, and generates a previous value Y" (t−1) of the estimated intake air amount 403. Then, the primary delay processing unit 404 outputs the previous value Y" (t−1) of the estimated intake air amount 403 to the primary delay coefficient calculation unit 301.

Again, the primary delay coefficient calculation unit (primary delay coefficient calculation unit 301) calculates the primary delay coefficient 304. At this time, the primary delay coefficient calculation unit (primary delay coefficient calculation unit 301) calculates the primary delay coefficient (primary delay coefficient 304) by using the previous value of the estimated intake air amount (previous value Y" (t−1) of the estimated intake air amount 403) instead of the previous value of the actual intake air amount. Therefore, the primary delay coefficient calculation unit 301 automatically calculates the primary delay coefficient 304 based on the input target intake air amount 303 (target intake air amount X' (t)), the current value of the actual intake air amount output from the constant delay processing unit 400, and the previous value Y" (t−1) of the estimated intake air amount 403.

The primary delay processing unit 302 performs primary delay processing on the low response target torque 207 by using the primary delay coefficient 304 limited by the primary delay coefficient limiting processing unit 402 as an input, and outputs the calculated estimated torque to the ignition and fuel operation torque correction factor calculation unit 212.

Here, a processing example of the divergence prevention processing unit 401 and the primary delay coefficient limiting processing unit 402 will be described with reference to FIGS. 11 and 12, and then a processing example of the constant delay processing unit 400 and the primary delay processing unit 404 will be described.

Figure 11:
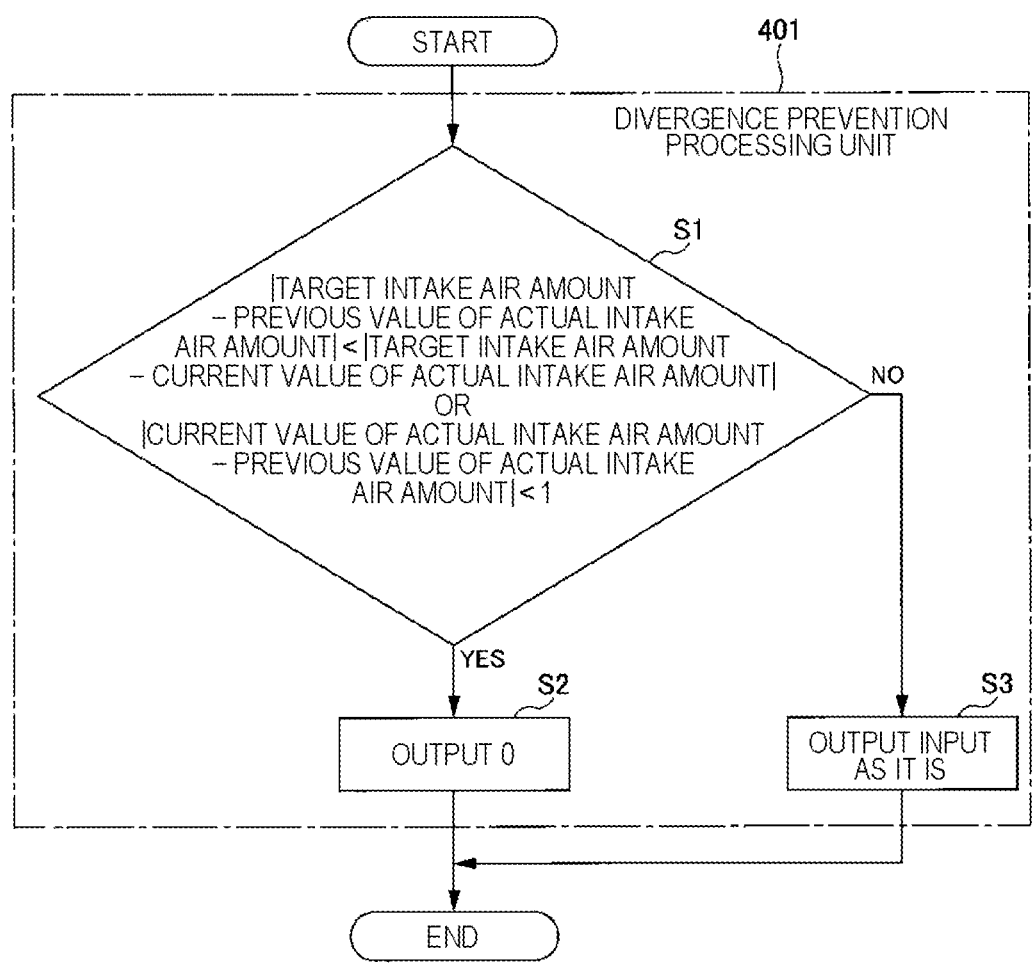
FIG. 11 is a flowchart illustrating an example of processing of a divergence prevention processing unit according to the second embodiment of the present invention.

FIG. 11 is a flowchart illustrating an example of processing of the divergence prevention processing unit 401.

The divergence prevention processing unit 401 determines whether a condition that an absolute value of "target intake air amount−previous value of actual intake air amount" is less than an absolute value of "target intake air amount−current value of actual intake air amount", or a condition that "current value of actual intake air amount−previous value of actual intake air amount" is less than "1" is satisfied (S1). The absolute value is obtained for each condition in step S1 in order to prevent each calculated value from becoming a negative value. Here, the condition that the absolute value of "target intake air amount−previous value of actual intake air amount" is less than the absolute value of "target intake air amount−current value of actual intake air amount" is used to limit the primary delay coefficient 304 so that, for example, the primary delay coefficient 304 does not drop too much due to a sudden fluctuation in the actual intake air amount.

If anyone of the two conditions in step S1 is satisfied (YES in S1), the divergence prevention processing unit 401 outputs the primary delay coefficient 304 to the primary delay coefficient limiting processing unit 402 as "0" (S2), and ends the processing. If neither of the conditions is satisfied (NO in S1), the divergence prevention processing unit 401 outputs the primary delay coefficient 304 input from the primary delay coefficient calculation unit 301 to the primary delay coefficient limiting processing unit 402 as it is (S3), and ends the processing.

Figure 12:
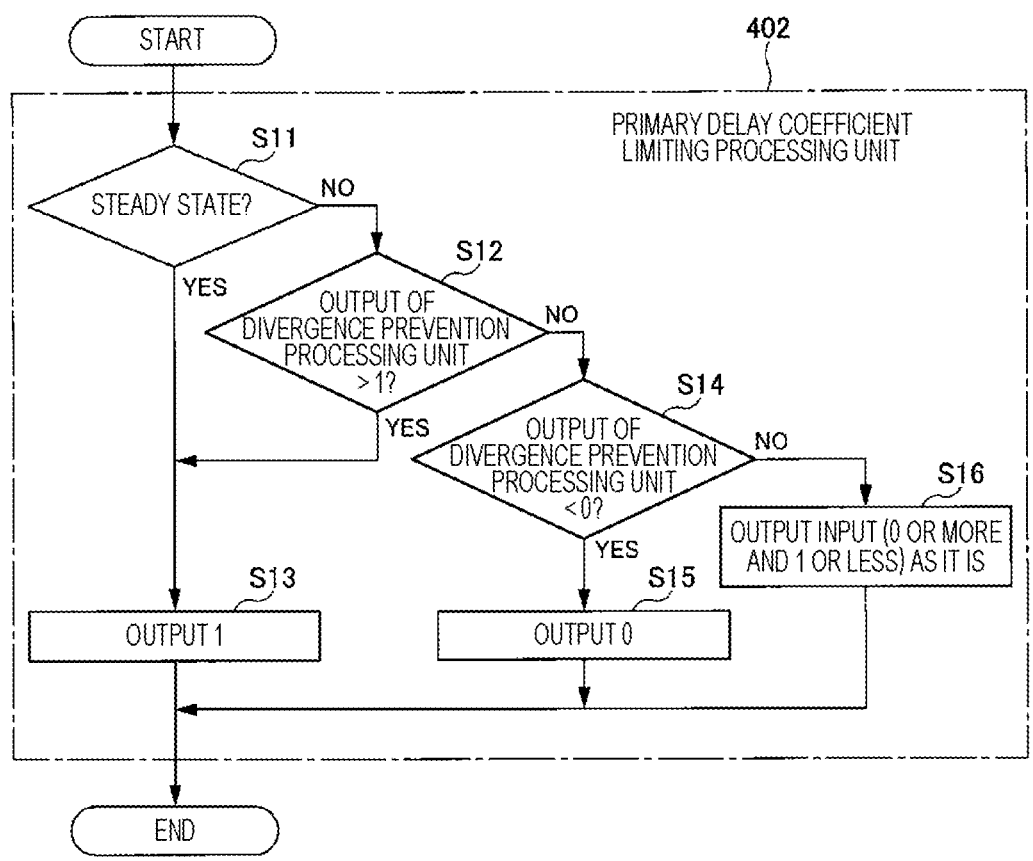
FIG. 12 is a flowchart illustrating an example of processing of a primary delay coefficient limiting processing unit according to the second embodiment of the present invention.

FIG. 12 is a flowchart illustrating an example of processing of the primary delay coefficient limiting processing unit 402.

The primary delay coefficient limiting processing unit 402 determines whether or not it is in a steady state (S11). If it is in the steady state (YES in S11), the primary delay coefficient limiting processing unit 402 outputs "1" as the primary delay coefficient 304 to the primary delay processing unit 404 (S13), and ends the processing. If it is not in the steady state (NO in S11), it is determined whether or not the primary delay coefficient 304 input from the divergence prevention processing unit 401 exceeds "1" (S12). If the primary delay coefficient 304 input from the divergence prevention processing unit 401 exceeds "1" (YES in S12), the primary delay coefficient limiting processing unit 402 outputs "1" to the primary delay processing unit 404 (S13), and ends the processing.

If the primary delay coefficient 304 input from the divergence prevention processing unit 401 is "1" or less (NO in S12), the primary delay coefficient limiting processing unit 402 determines whether or not the primary delay coefficient 304 input from the divergence prevention processing unit 401 is less than "0" (S14). If the primary delay coefficient 304 input from the divergence prevention processing unit 401 is less than "0" (YES in S14), the primary delay coefficient limiting processing unit 402 outputs "0" to the primary delay processing unit 404 (S15), and ends the processing.

If the primary delay coefficient 304 input from the divergence prevention processing unit 401 is "0" or more (NO in S14), the primary delay coefficient limiting processing unit 402 outputs the primary delay coefficient 304 input to the primary delay processing units 302 and 404 as it is (S16), and ends the processing. That is, in step S16, if the primary delay coefficient 304 input from the divergence prevention processing unit 401 is "0 or more and less than 1", the input as it is output.

Next, the processing of the constant delay processing unit 400 and the primary delay processing unit 404 will be described with reference to FIGS. 14 and 15.

Figure 14:
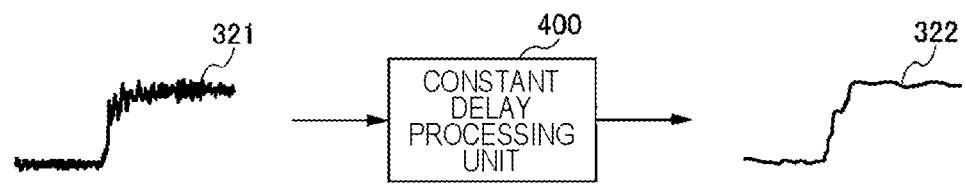
FIG. 14 is an explanatory diagram illustrating an aspect of processing in which a constant delay processing unit reduces the vibration of the actual intake air amount according to the second embodiment of the present invention.

FIG. 14 is an explanatory diagram illustrating an aspect of processing in which the constant delay processing unit 400 reduces the vibration of the actual intake air amount.

As described above, the constant delay processing unit 400 performs the filter processing with the delay coefficient as the constant in order to reduce the vibration of the actual intake air amount. Therefore, for example, the constant delay processing unit 400 performs the filter processing with the delay coefficient as the constant, which is shown in the following equation (4), with respect to the actual intake air amount input to the estimated torque calculation unit 210A, and obtains the current value of the actual intake air amount.

Current Value of Output of Constant Delay Processing Unit=Constant×Actual Intake Air Amount+ (1−Constant)×Previous Value of Output of Constant Delay Processing Unit (4)

As illustrated in FIG. 14, an actual intake air amount 321 including the vibration input from the left side of the constant delay processing unit 400 is output as an actual intake air amount 322 whose vibration is reduced by the filtering processing of the constant delay processing unit 400. The actual intake air amount 322 with reduced vibration is input to the primary delay coefficient calculation unit 301.

In the present embodiment, the constant delay processing unit 400 performs the filter processing on the actual intake air amount, but the filter processing may be performed on the primary delay coefficient 304 calculated based on the actual intake air amount. In this case, the constant delay processing unit 400 is provided between the primary delay coefficient calculation unit 301 and the divergence prevention processing unit 401.

As illustrated in FIG. 14, the filter processing performed by the constant delay processing unit 400 reduces the vibration of the actual intake air amount, but does not completely eliminate the vibration. In addition, in the calculation of Equation (1) performed by the primary delay coefficient calculation unit 301, since the current value Y' (t) and the previous value Y' (t−1) of the actual intake air amount are used, there are two types of terms including the vibration. Therefore, the primary delay coefficient calculation unit 301 may not be able to properly calculate the primary delay coefficient 304.

Figure 15:
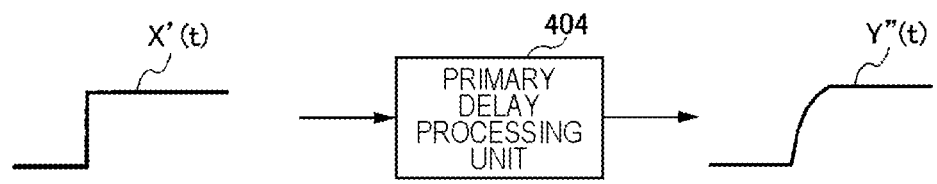
FIG. 15 is an explanatory diagram illustrating an aspect in which a primary delay processing unit calculates an estimated intake air amount by performing primary delay processing on a target intake air amount according to the second embodiment of the present invention.

In the calculation of the primary delay coefficient 304 performed by the primary delay coefficient calculation unit 301 in order to reduce the terms including the vibration, instead of the previous value Y' (t−1) of the actual intake air amount, a previous value Y" (t−1) of the estimated intake air amount 403 illustrated in Equation (5) of FIG. 15 is used. However, Equation (5) shall satisfy Equation (6).

[Equation 5]
$$Y''(t) = \alpha X'(t) + (1-\alpha)Y''(t-1) \quad (5)$$

[Equation 6]
$$\text{However, } \alpha = \frac{Y'(t) - Y''(t-1)}{X'(t) - Y''(t-1)} \quad (6)$$

FIG. 15 is an explanatory diagram illustrating an aspect in which the primary delay processing unit 404 calculates an estimated intake air amount by performing primary delay processing on a target intake air amount.

The primary delay processing unit 404 performs primary delay processing using the equations (5) and (6) with respect to the input target intake air amount 303 (target intake air amount X' (t)). Then, the primary delay processing unit 404 outputs the current value Y" (t) of the estimated intake air amount 403. The previous value Y" (t−1) of the estimated intake air amount 403 is input to the primary delay coefficient calculation unit 301, and is used as the previous value Y' (t−1) of the actual intake air amount in the equation (1).

The primary delay coefficient 304 calculated by the primary delay coefficient calculation unit 301 is output to the divergence prevention processing unit 401 again.

Thereafter, the primary delay coefficient 304 subjected to the divergence prevention processing by the divergence prevention processing unit 401 is limited by the primary delay coefficient limiting processing unit 402, and is then output to the primary delay processing unit 302 as the primary delay coefficient 304. Then, the primary delay processing unit 302 can calculate the estimated torque by performing the primary delay processing based on the low response target torque 207 and the primary delay coefficient 304 whose output is limited.

The estimated torque calculation unit 210A according to the second embodiment described above calculates the low response target torque 207 as the estimated torque in the steady state. At this time, the estimated torque calculation unit 210A switches the primary delay coefficient 304 if a mathematical contradiction or divergence occurs in the calculation using the equation (1) for obtaining the primary delay coefficient 304. This makes it possible to prevent the mathematical contradiction or divergence in the calculation of the primary delay coefficient 304.

In addition, the constant delay processing unit 400 included in the estimated torque calculation unit 210A can perform the filter processing for reducing the vibration of the actual intake air amount. Therefore, even if the input actual intake air amount includes the vibration, the vibration is reduced. In addition, the primary delay coefficient calculation unit 301 calculates the primary delay coefficient 304 by using the previous value Y" (t−1) of the estimated intake air amount 403 instead of the previous value Y' (t−1) of the actual intake air amount in the calculation of the primary delay coefficient 304. As a result, it is possible to reduce the deterioration of the calculation accuracy due to the vibration of the actual intake air amount used by the estimated torque calculation unit 210A for the calculation of the primary delay coefficient 304.

As described above, the estimated torque calculation unit 210A according to the second embodiment improves the stability of the calculation without sudden change or vibration in the calculated value of the primary delay coefficient 304 in the steady state and the transient state. In addition, the deterioration of the calculation accuracy due to the vibration of the actual intake air amount can be reduced.

Third Embodiment

Next, a configuration example and an operation example of an estimated torque calculation unit according to a third embodiment will be described with reference to FIGS. 16 to 19.

First, a point where the target intake air amount and the actual intake air amount are offset will be described with reference to FIG. 17.

Figure 17:
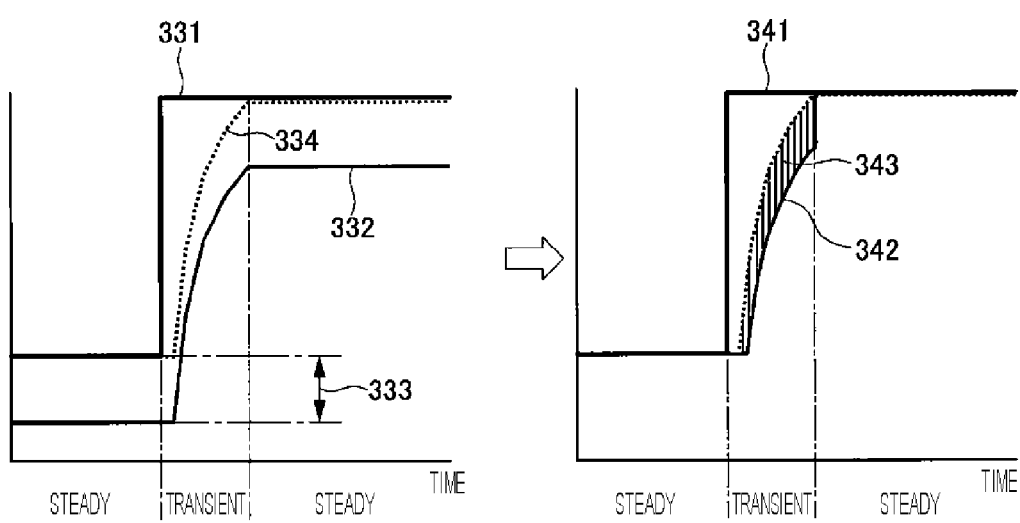
FIG. 17 is an explanatory diagram illustrating an example in which a torque estimation error occurs in a low response target torque and an estimated torque due to an offset between a target intake air amount and an actual intake air amount according to the third embodiment of the present invention.

FIG. 17 is an explanatory diagram illustrating an example in which a torque estimation error 343 occurs in a low response target torque 341 and estimated torque 342 due to an offset 333 between a target intake air amount 331 and an actual intake air amount 332.

An upper chart of FIG. 17 illustrates an aspect in which the offset 333 occurs between the target intake air amount 331 and the actual intake air amount 332. As described above, in the steady state, the target intake air amount 331 and the actual intake air amount 332 should coincide with each other. However, due to the influence of sensor error, environmental change, or the like, the offset 333 may occur between the target intake air amount 331 and the actual intake air amount 332 in the steady state. In this case, since the actual intake air amount 332 does not become a value illustrated by a broken line 334, but is a value lower by the offset 333 as much as, the target intake air amount 331 and the actual intake air amount 332 in the steady state deviate from each other.

A lower chart of FIG. 17 illustrates an aspect in which the torque estimation error 343 occurs in the estimated torque 342 calculated by the change in the actual intake air amount. As illustrated in the upper chart, the estimated torque 342 that does not reach the low response target torque 341 is obtained due to the influence of the offset 333 generated between the target intake air amount 331 and the actual intake air amount 332. Then, the torque estimation error 343 represented by a vertical line remains in the estimated torque 342 in the transient state. Therefore, when the steady state is reached, the actually generated torque needs to be suddenly changed so that the estimated torque 342 coincides with the low response target torque 341. If there is a torque estimation error 343 in this way, the torque estimation accuracy with respect to the estimated torque 342 deteriorates. Therefore, offset processing for reducing the deterioration of the torque estimation accuracy is added to the estimated torque calculation unit 210A according to the second embodiment.

Then, in the present embodiment, as illustrated in the lower chart of FIG. 17, due to the occurrence of the offset 333, it prevents the estimated torque 342 from not converging to the low response target torque 341 by the end of the transient period due to the occurrence of the offset 333. Therefore, processing of switching a lower limit value of the primary delay coefficient 304 by a condition determination is added to the estimated torque calculation unit 210A according to the second embodiment.

Figure 16:
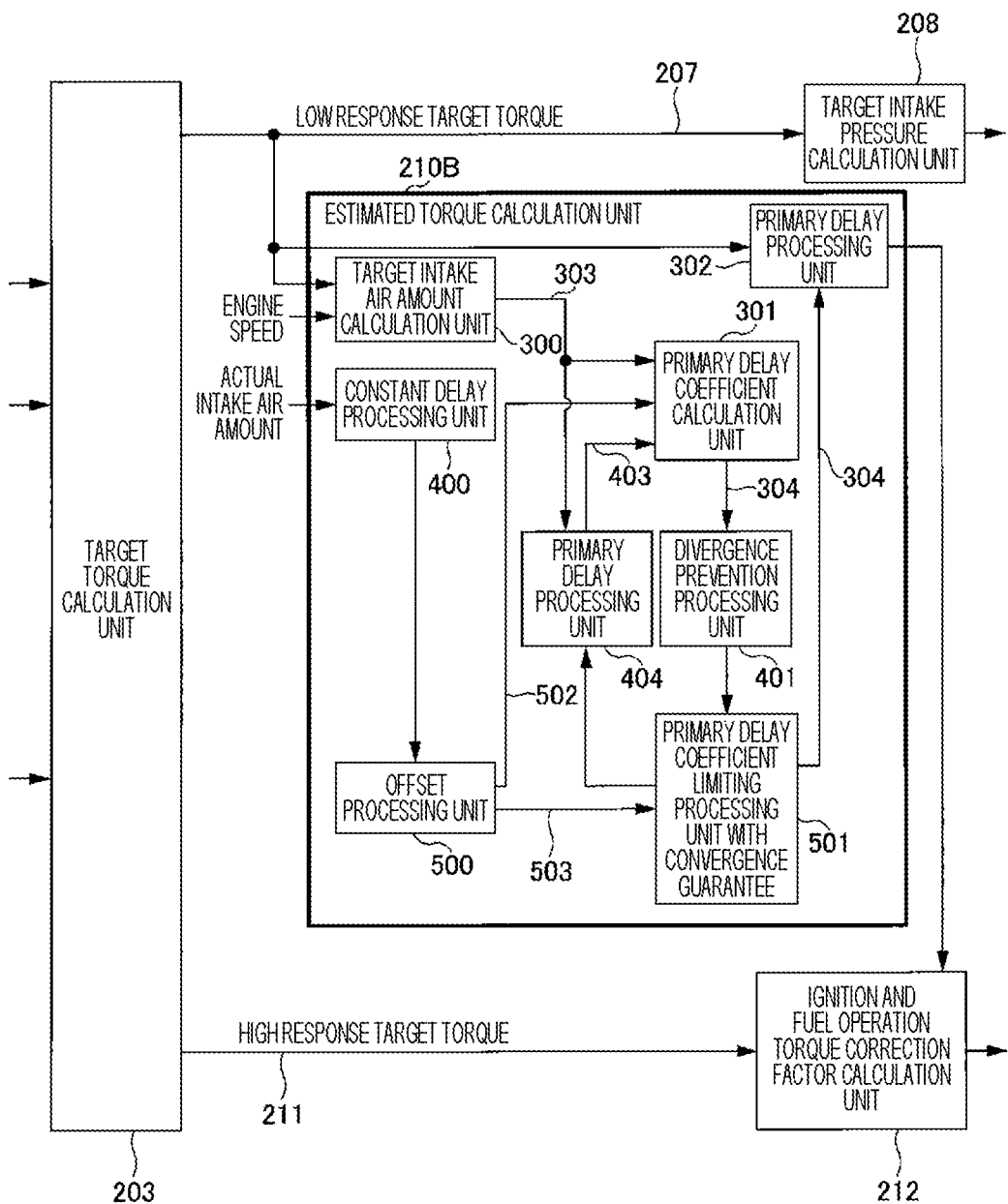
FIG. 16 is a functional block diagram illustrating a configuration example of an estimated torque calculation unit according to a third embodiment of the present invention.

FIG. 16 is a functional block diagram illustrating a configuration example of an estimated torque calculation unit 210B according to the third embodiment.

The estimated torque calculation unit (estimated torque calculation unit 210B) includes an offset processing unit (offset processing unit 500) added to the estimated torque calculation unit 210A according to the second embodiment, and further includes a second primary delay coefficient limiting processing unit (primary delay coefficient limiting processing unit 501 with convergence guarantee) that replaces the primary delay coefficient limiting processing unit 402.

Here, the constant delay processing unit (constant delay processing unit 400) included in the estimated torque calculation unit 210B performs the filter processing with the delay coefficient as the constant for reducing the vibration of the actual intake air amount. Thereafter, the constant delay processing unit 400 outputs the actual intake air amount with reduced vibration to the offset processing unit 500.

The offset processing unit 500 performs offset processing for adding or subtracting an offset value to or from the input actual intake air amount during the transient period from the start of the transient period. At this time, the offset processing unit (offset processing unit 500) performs offset processing on the actual intake air amount on which the filter processing is performed by the constant delay processing unit (constant delay processing unit 400) by using the offset value obtained in the steady state in which when the target intake air amount and the actual intake air amount coincide with each other. Then, the offset processing unit 500 outputs the offset actual intake air amount on which the offset processing is performed to the primary delay coefficient calculation unit 301. At the same time, the offset processing unit 500 outputs the offset value 503 used for the offset processing to the primary delay coefficient limiting processing unit 501 with convergence guarantee.

The primary delay coefficient calculation unit (primary delay coefficient calculation unit 301) calculates the primary delay coefficient (primary delay coefficient 304) based on the target intake air amount, the actual intake air amount on which the offset processing is performed, and the estimated intake air amount of the engine (engine 10).

Since the processing of the divergence prevention processing unit 401 is the same as the processing described with reference to FIG. 10, a detailed description thereof will be omitted.

The second primary delay coefficient limiting processing unit (primary delay coefficient limiting processing unit 501 with convergence guarantee) has a convergence guarantee function of limiting (converging) the primary delay coefficient (primary delay coefficient 304) by switching the lower limit value of the primary delay coefficient (primary delay coefficient 304) whose divergence is prevented by the divergence prevention processing unit (divergence prevention processing unit 401) to a different value. At the time of convergence of the primary delay coefficient 304, the primary delay coefficient limiting processing unit 501 with convergence guarantee switches the lower limit value of the primary delay coefficient 304 according to information such as an input offset value 503, whether or not the target intake air amount 303 increases, and an elapsed time from the start of the transient period, in addition to the primary delay coefficient limiting processing performed by the primary delay coefficient limiting processing unit 402 according to the second embodiment. Then, the primary delay coefficient 304 is output from the primary delay coefficient limiting processing unit 501 with convergence guarantee to the primary delay processing units 302 and 404.

The second primary delay processing unit (primary delay processing unit 404) performs the primary delay processing of the target intake air amount and calculates the estimated intake air amount (estimated intake air amount 403) of the engine (engine 10) based on the target intake air amount and the primary delay coefficient (primary delay coefficient 304) limited by the second primary delay coefficient limiting processing unit (primary delay coefficient limiting processing unit 501 with convergence guarantee). Then, the second primary delay processing unit (primary delay processing unit 404) outputs the estimated intake air amount (estimated intake air amount 403) to the primary delay coefficient calculation unit (primary delay coefficient calculation unit 301). Thereafter, the primary delay coefficient calculation unit 301 performs processing of calculating the primary delay coefficient 304 using the estimated intake air amount 403 input from the primary delay processing unit 404.

The primary delay processing unit 302 performs primary delay processing on the low response target torque 207 by using the primary delay coefficient 304, which is limited by the primary delay coefficient limiting processing unit 501 with convergence guarantee and whose lower limit value has been switched as an input. Then, the primary delay processing unit 302 outputs the calculated estimated torque to the ignition and fuel operation torque correction factor calculation unit 212.

Here, a processing example of the offset processing unit 500 and the primary delay coefficient limiting processing unit 501 with convergence guarantee will be described with reference to FIGS. 18 and 19.

Figure 18:
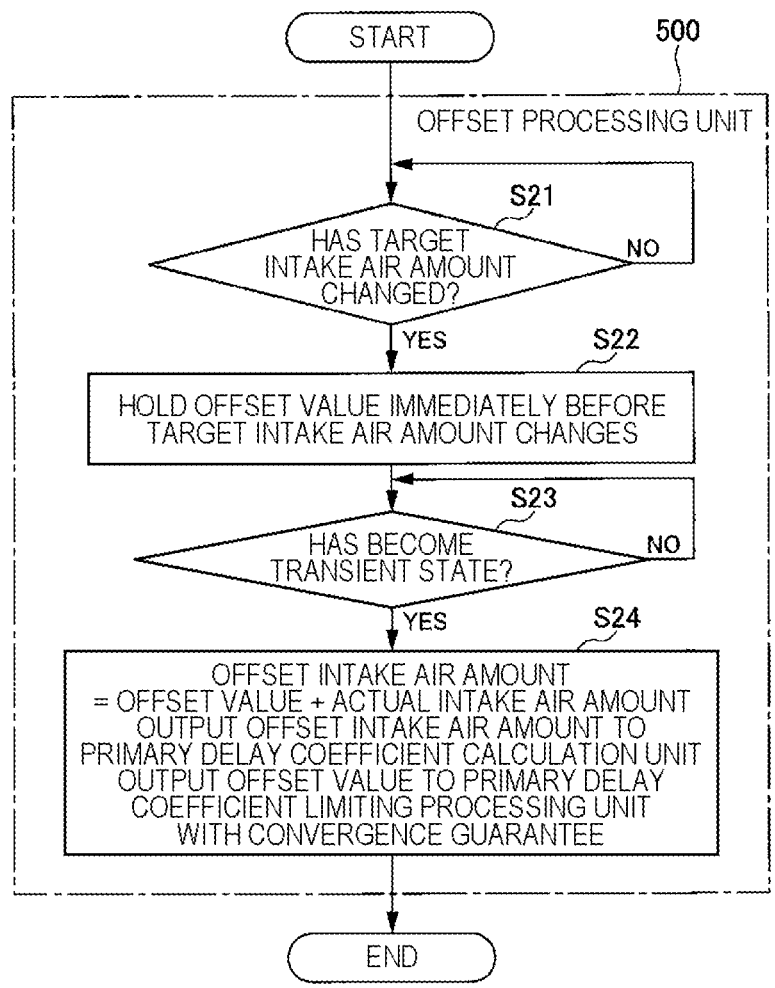
FIG. 18 is a flowchart illustrating an example of processing of an offset processing unit according to the third embodiment of the present invention.

FIG. 18 is a flowchart illustrating an example of processing of the offset processing unit 500.

First, the offset processing unit 500 determines whether or not the target intake air amount 303 has changed (S21). If it is determined that the target intake air amount 303 has not changed (NO in S21), the offset processing unit 500 repeats the processing in step S21 and continues to monitor the target intake air amount 303.

On the other hand, if it is determined that the target intake air amount 303 has changed (YES in S21), the offset processing unit 500 holds the offset value 503 immediately before the target intake air amount 303 changes, that is, in the steady state (S22). Next, the offset processing unit 500 determines whether or not the low response target torque 31 has become a transient state (S23). If it is determined that the low response target torque 31 is not in the transient state (NO in S23), the offset processing unit 500 repeats the processing in step S23 and continues the state monitoring.

On the other hand, if it is determined that the low response target torque 31 is in the transient state (YES in S23), the offset processing unit 500 calculates the offset intake air amount 502. Here, the offset intake air amount 502 is obtained by adding or subtracting the offset value 503 to or from the actual intake air amount. Therefore, the offset value 503 takes a positive or negative value. Then, the offset processing unit 500 outputs the calculated offset intake air amount 502 to the primary delay coefficient calculation unit 301. In addition, the offset processing unit 500 outputs the offset value 503 used for the calculation of the offset processing to the primary delay coefficient limiting processing unit 501 with convergence guarantee (S24), and ends the processing.

Figure 19:
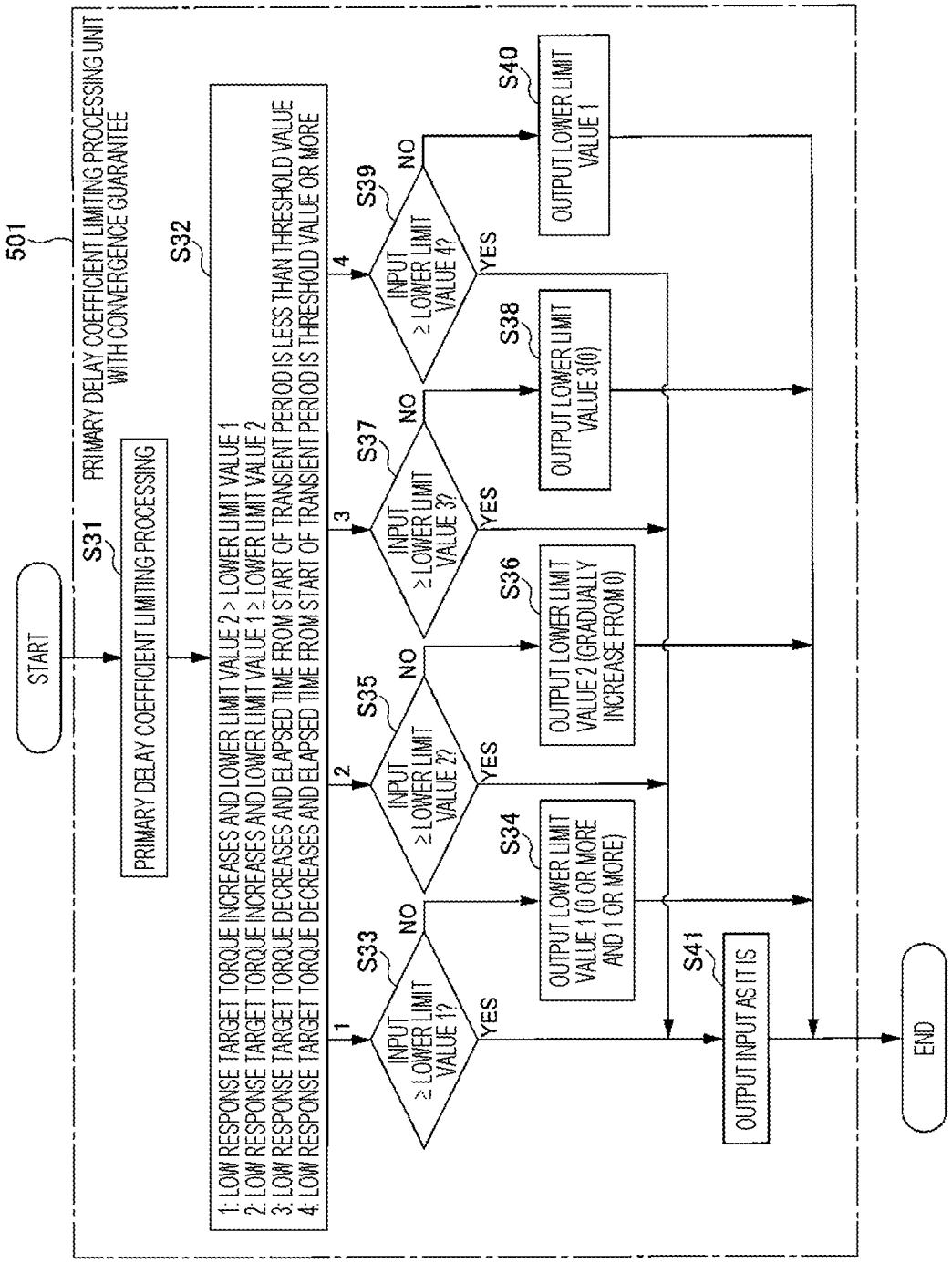
FIG. 19 is a flowchart illustrating an example of processing of a primary delay coefficient limiting processing unit with convergence guarantee according to the third embodiment of the present invention.

FIG. 19 is a flowchart illustrating an example of processing of the primary delay coefficient limiting processing unit 501 with convergence guarantee.

First, the primary delay coefficient limiting processing unit 501 with convergence guarantee performs the primary delay coefficient limiting processing performed by the primary delay coefficient limiting processing unit 402 according to the second embodiment (S31). Next, the primary delay coefficient limiting processing unit 501 with convergence guarantee increases or decreases the low response target torque 207, and determines a condition based on the lower limit value or the like (S32). In the present embodiment, there are four conditions, and when any of the conditions is satisfied, the next processing is performed. Note that the numerical values attached to the arrows toward steps S33, S35, S37, and S39 represent the condition numbers assigned to each condition. When any of the conditions is satisfied, subsequent processing that matches the condition number is performed.

Each value illustrated in the condition will be described.

A lower limit value 1 is an output value from a data table in which an absolute value of the offset value 503 is input, and is a value near 0 in the range of 0 or more and 1 or less.

A lower limit value 2 is a calculated value of a quadratic function for an elapsed time from the start of the transient period, and is a value that moves so as to gradually increase from 0.

A lower limit value 3=0.

A lower limit value 4=the lower limit value 1.

As illustrated in condition 1 of step S32, when the low response target torque 207 increases and the lower limit value 2 is larger than the lower limit value 1, the primary delay coefficient limiting processing unit 501 with convergence guarantee determines whether or not the primary delay coefficient 304 on which the primary delay coefficient limiting processing is performed is the lower limit value 1 or more (S33). If it is determined that the primary delay coefficient 304 is the lower limit value 1 or more (YES in S33), the primary delay coefficient limiting processing unit 501 with convergence guarantee outputs an input as it is (S41), and ends the processing. Here, an output destination in step S41 is the primary delay processing units 302 and 404, as illustrated in FIG. 16.

On the other hand, if it is determined that the primary delay coefficient 304 is less than the lower limit value 1 (NO in S33), the primary delay coefficient limiting processing unit 501 with convergence guarantee outputs the lower limit value 1 to the primary delay processing units 302 and 404 (S34), and ends the processing.

As illustrated in condition 2 of step S32, when the low response target torque 207 increases and the lower limit value 1 the lower limit value 2 is satisfied, the primary delay coefficient limiting processing unit 501 with convergence guarantee determines whether or not the primary delay coefficient 304 on which the primary delay coefficient limiting processing is performed is the lower limit value 2 or more (S35). If it is determined that the primary delay coefficient 304 is the lower limit value 2 or more (YES in S35), the primary delay coefficient limiting processing unit 501 with convergence guarantee outputs an input as it is (S41), and ends the processing. On the other hand, if it is determined that the primary delay coefficient 304 is less than the lower limit value 2 (NO in S35), the primary delay coefficient limiting processing unit 501 with convergence guarantee outputs the lower limit value 2 to the primary delay processing units 302 and 404 (S36), and ends the processing.

As illustrated in condition 3 of step S32, when the low response target torque 207 decreases and the elapsed time from the start of the transient period is less than a threshold value (beginning of the transient state), the primary delay coefficient limiting processing unit 501 with guaranteed convergence determines whether or not the primary delay coefficient 304 on which the primary delay coefficient limiting processing is performed is the lower limit value 3 or more (S37). If it is determined that the primary delay coefficient 304 is the lower limit value 3 or more (YES in S37), the primary delay coefficient limiting processing unit 501 with convergence guarantee outputs an input as it is (S41), and ends the processing. On the other hand, if it is determined that the primary delay coefficient 304 is less than the lower limit value 3 (NO in S37), the primary delay coefficient limiting processing unit 501 with convergence guarantee outputs the lower limit value 3 to the primary delay processing units 302 and 404 (S38), and ends the processing.

As illustrated in condition 4 of step S32, when the low response target torque 207 decreases and the elapsed time from the start of the transient period is the threshold value or more (the middle to the end of the transient state), the primary delay coefficient limiting processing unit 501 with guaranteed convergence determines whether or not the primary delay coefficient 304 on which the primary delay coefficient limiting processing is performed is the lower limit value 4 or more (S39). If it is determined that the primary delay coefficient 304 is the lower limit value 4 or more (YES in S39), the primary delay coefficient limiting processing unit 501 with convergence guarantee outputs an input as it is (S41), and ends the processing. On the other hand, if it is determined that the primary delay coefficient 304 is less than the lower limit value 4 (NO in S39), the primary delay coefficient limiting processing unit 501 with convergence guarantee outputs the lower limit value 1 to the primary delay processing units 302 and 404 (S40), and ends the processing.

The estimated torque calculation unit 210B according to the third embodiment described above performs the offset processing on the actual intake air amount in order to reduce the deterioration of the calculation accuracy due to the offset in the actual intake air amount used for the calculation of the primary delay coefficient 304. Further, the estimated torque calculation unit 210B switches the lower limit value of the primary delay coefficient 304 in order to prevent the estimated torque, which is the calculation result, from converging on the low response target torque 207 due to the offset in the actual intake air amount used for the calculation of the primary delay coefficient 304.

As described above, the estimated torque calculation unit 210B according to the third embodiment can reduce the deterioration of the calculation accuracy of the estimated torque due to the offset in the actual intake air amount. In addition, the estimated torque calculation unit 210B makes it easier for the estimated torque to approach the target torque during the transient period by performing the offset processing. Therefore, it is possible to prevent the calculated estimated torque from not converging on the target torque due to the offset in the actual intake air amount.

Fourth Embodiment

Next, a configuration example and an operation example of an estimated torque calculation unit according to a fourth embodiment will be described with reference to FIGS. 20 to 22. Here, an example in which the calculation process of the estimated torque according to the present embodiment is applied to a hybrid vehicle will be described.

Figure 20:
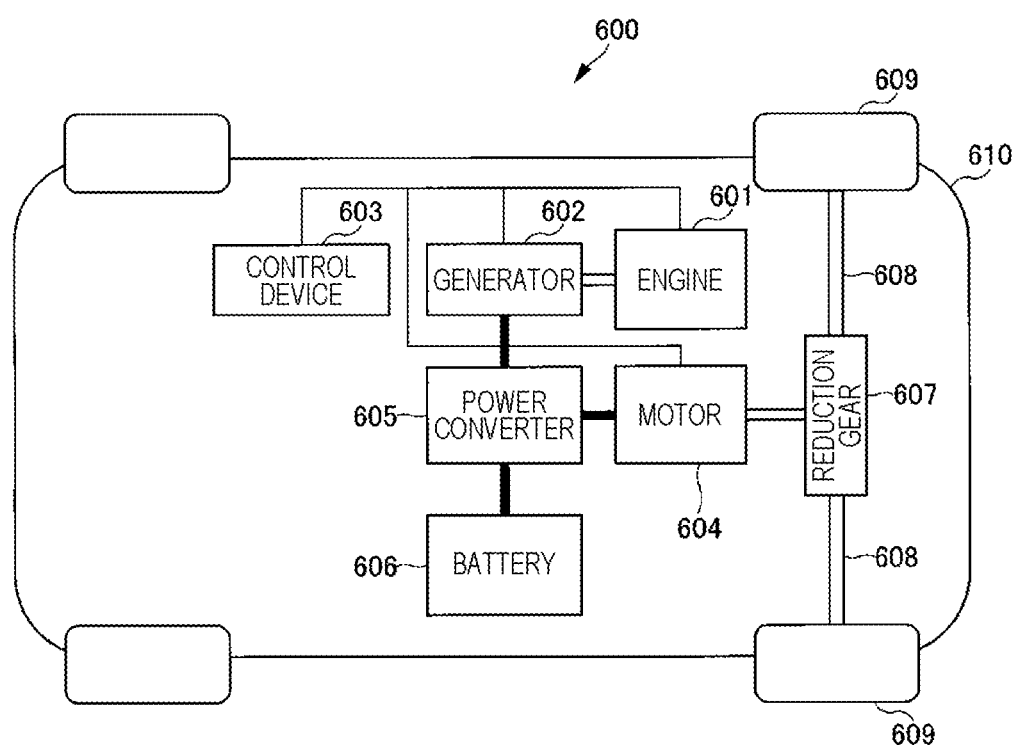
FIG. 20 is an explanatory diagram illustrating a configuration example of a hybrid vehicle according to a fourth embodiment of the present invention.

FIG. 20 is an explanatory diagram illustrating a configuration example of a hybrid vehicle 600.

The hybrid vehicle 600 includes an engine 601, a generator 602, a control device 603, a motor 604, a power converter 605, a battery 606, a reduction gear 607, an axle 608, a tire 609, and a body 610 on which these devices are mounted.

The engine 601 transmits a driving force to the generator 602.

The generator 602 generates electricity by the driving force transmitted from the engine 601 and outputs AC power to the power converter 605.

The control device 603 controls an operation of each device of the engine 601, the generator 602, and the motor 604. The control device 603 is configured by the same functional blocks as the ECU 102 described with reference to FIG. 7, and is used as an example of the engine control device. Therefore, the control device 603 calculates the low response target torque 207 and the high response target torque 211 to obtain the estimated torque. In addition, the control device 603 can realize a desired engine torque in the transient state by the ignition timing correction amount and the number of fuel cut cylinders so as to bring the estimated torque closer to the high response target torque 211.

The power converter 605 converts the AC power input from the generator 602 into appropriate power and outputs it to the motor 604 to drive the motor 604. In addition, the power converter 605 converts the AC power input from the generator 602 so that the battery 606 can store the AC power, and charges the battery 606.

A driving shaft of the motor 604 is connected to the reduction gear 607, and the driving force of the motor 604 is transmitted to the reduction gear 607.

The reduction gear 607 rotationally drives the axle 608 connected to the left and right tires 609. Therefore, the left and right tires 609 rotate according to a traveling direction of the hybrid vehicle 600, and the hybrid vehicle 600 travels.

Figure 21:
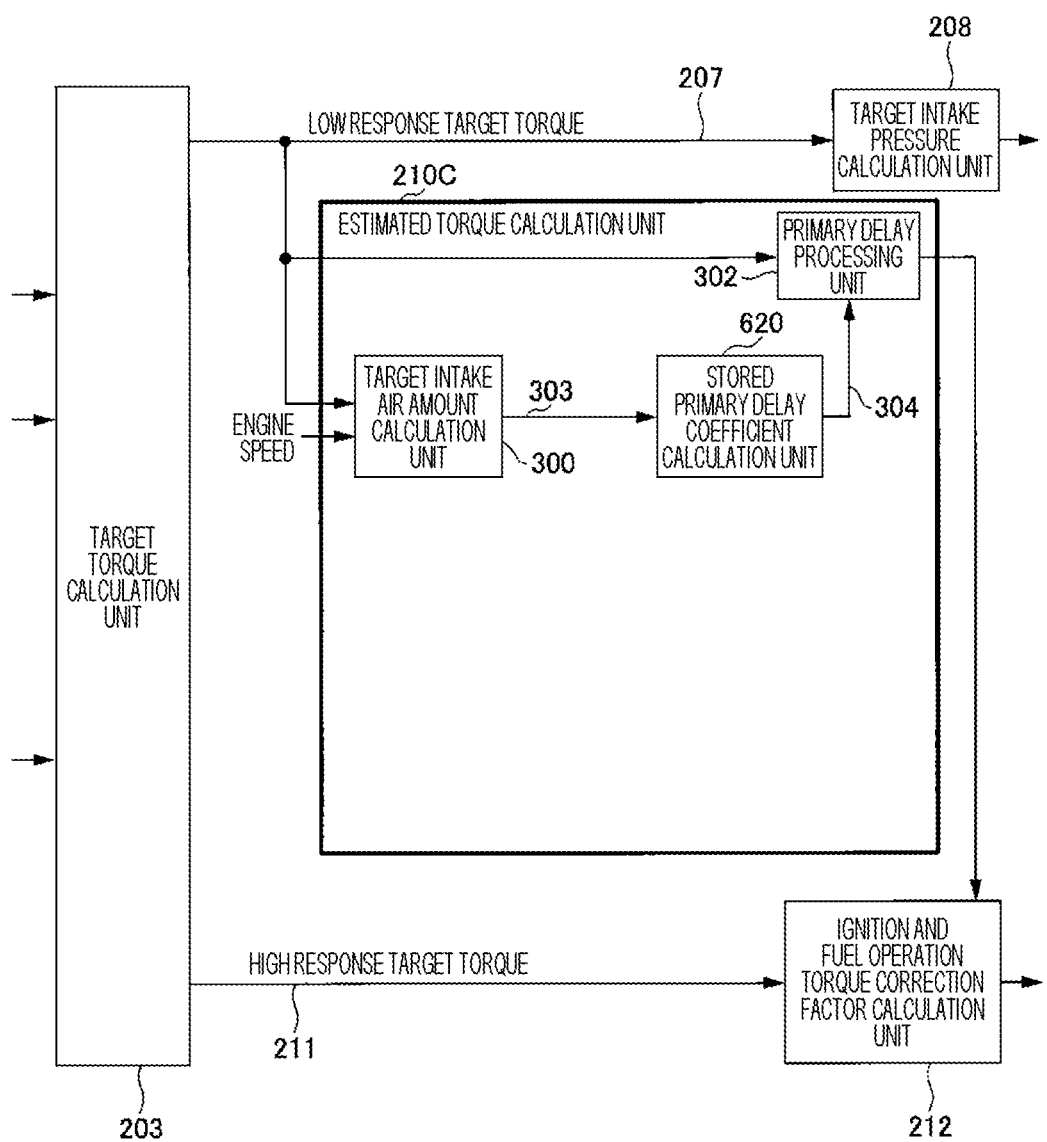
FIG. 21 is a functional block diagram illustrating a configuration example of an estimated torque calculation unit according to the fourth embodiment of the present invention.

FIG. 21 is a functional block diagram illustrating a configuration example of an estimated torque calculation unit 210C according to the fourth embodiment.

The estimated torque calculation unit 210C is configured in the control device 603 illustrated in FIG. 20. The estimated torque calculation unit (estimated torque calculation unit 210C) includes a stored primary delay coefficient calculation unit 620 that replaces the primary delay coefficient calculation unit 301 of the estimated torque calculation unit 210 according to the first embodiment.

Figure 22:
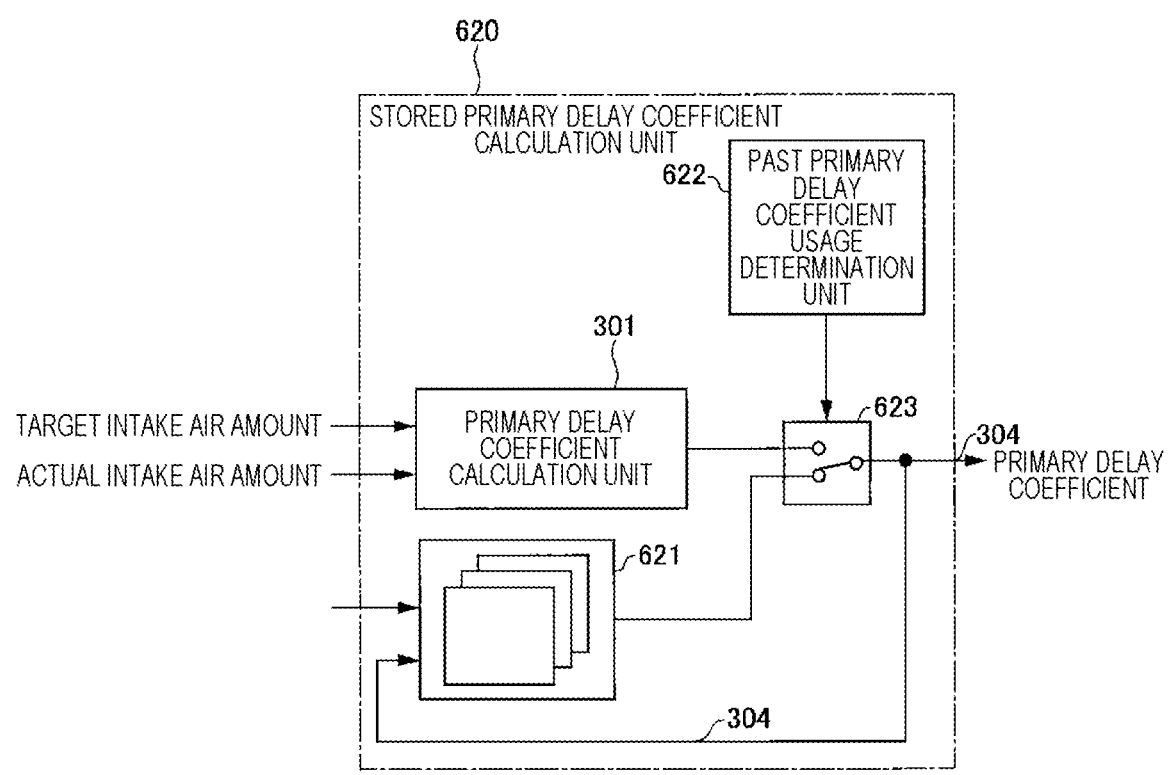
FIG. 22 is a functional block diagram illustrating a configuration example of a stored primary delay coefficient calculation unit according to the fourth embodiment of the present invention.

However, as illustrated in FIG. 22, which will be described later, the primary delay coefficient calculation unit 301 is configured to be incorporated into the stored primary delay coefficient calculation unit 620.

The stored primary delay coefficient calculation unit 620 automatically calculates the primary delay coefficient 304 by inputting the target intake air amount 303 calculated by the target intake air amount calculation unit 300. At this time, the stored primary delay coefficient calculation unit 620 calculates and outputs the stored primary delay coefficient 304 (referred to as "stored primary delay coefficient") to the primary delay processing unit 302.

Here, the reason why the stored primary delay coefficient calculation unit 620 automatically calculates the primary delay coefficient 304 that has been calculated in the past and stored as a map will be described.

When the hybrid vehicle 600 does not directly transmit the driving force of the engine 601 to the axle 608, an operating range of the engine torque of the engine 601 can be limited. In this case, since a transient behavior of the engine 601 is limited, the same transient behavior may be repeated. If the same transient behavior is repeated, the estimated torque calculation unit 210C does not need to perform the calculation of the estimated torque of each time as illustrated in the first to third embodiments described above.

Therefore, the estimated torque calculation unit 210C reduces a calculation load of the estimated torque calculation unit 210C by using, for example, the primary delay coefficient 304 which is the calculation result obtained by the calculation in the past. Therefore, when the same transient behavior is repeated, the processing of calculating the primary delay coefficient 304 selected from the map storing the primary delay coefficient used in the past is added to the estimated torque calculation unit 210 according to the first embodiment.

FIG. 22 is a functional block diagram illustrating a configuration example of a stored primary delay coefficient calculation unit 620.

The stored primary delay coefficient calculation unit 620 includes the primary delay coefficient calculation unit 301, a past primary delay coefficient storage unit (past primary delay coefficient storage unit 621), a past primary delay coefficient usage determination unit (past primary delay coefficient usage determination unit 622), and a primary delay coefficient switching unit (primary delay coefficient switching unit 623).

The primary delay coefficient calculation unit 301 automatically calculates a primary delay coefficient equivalent to the time constant $\tau$ calculated based on the target intake air amount 303 and the actual intake air amount that are input as in the first embodiment described above. The primary delay coefficient calculated by the primary delay coefficient calculation unit 301 is output to the primary delay coefficient switching unit 623.

The past primary delay coefficient storage unit 621 stores the primary delay coefficient used in the past. The primary delay coefficient is stored as a map for each driving scene of the hybrid vehicle 600. For example, the primary delay coefficient used in the driving scene where an engine speed is 2000 rpm and a torque is 100 N is stored in the past primary delay coefficient storage unit 621. Then, when the driving scene of the hybrid vehicle 600 is input to the past primary delay coefficient storage unit 621, the primary delay coefficient read from the past primary delay coefficient storage unit 621 according to the driving scene is output to the primary delay coefficient switching unit 623.

The past primary delay coefficient usage determination unit (past primary delay coefficient usage determination unit 622) determines one of the two primary delay coefficients, which is used, the one primary delay coefficient being output from the primary delay coefficient calculation unit 301 and the other primary delay coefficient being stored in the past primary delay coefficient storage unit 621 and used in a specific driving scene in the past, and outputs a determination result. For example, when the past primary delay coefficient usage determination unit 622 detects the repetition of the same transient behavior, the past primary delay coefficient usage determination unit 622 makes a determination using the primary delay coefficient, which is the past calculation result read from the past primary delay coefficient storage unit 621. Then, the past primary delay coefficient usage determination unit 622 outputs the determination result to the primary delay coefficient switching unit 623.

When the behavior of the engine (engine 601) is limited in the transient state in which the actual intake air amount changes by a set value or more within a set time in which the actual intake air amount changes, the primary delay coefficient switching unit 623 switches a primary delay coefficient to any one of the primary delay coefficient read from the past primary delay coefficient storage unit (past primary delay coefficient storage unit 621) and the primary delay coefficient calculated by the primary delay coefficient calculation unit (primary delay coefficient calculation unit 301), based on the determination result of the past primary delay coefficient usage determination unit (past primary delay coefficient usage determination unit 622), and outputs the primary delay coefficient. Here, the primary delay coefficient switching unit 623 switches the primary delay coefficient based on the determination result input from the past primary delay coefficient usage determination unit 622. Then, the primary delay coefficient switched by the primary delay coefficient switching unit 623 is output as the primary delay coefficient 304.

When the driving scene in which the engine speed is 2000 rpm and the torque is 100 N appears again as described above, the primary delay coefficient read from the past primary delay coefficient storage unit 621 is output as the primary delay coefficient 304. The primary delay coefficient 304 output from the stored primary delay coefficient calculation unit 620 is input to the primary delay processing unit 302 illustrated in FIG. 21. Then, the primary delay processing unit (primary delay processing unit 302) can perform the primary delay processing based on the target torque and the primary delay coefficient (primary delay coefficient 304) selected by the primary delay coefficient switching unit (primary delay coefficient switching unit 623), and can calculate the estimated torque of the engine (engine 601) in the transient state.

Note that when the past primary delay coefficient usage determination unit 622 makes the determination using the primary delay coefficient read from the past primary delay coefficient storage unit 621, the past primary delay coefficient usage determination unit 622 instructs the primary delay coefficient calculation unit 301 to stop the calculation processing of the primary delay coefficient. By the instruction, the primary delay coefficient calculation unit 301 can stop the processing of sequentially calculating the primary delay coefficient with respect to the target intake air amount and the actual intake air amount that are input.

When the transient behavior of the engine 601 is limited, the estimated torque calculation unit 210C according to the fourth embodiment described above calculates the primary delay coefficient 304 from the map storing the past calculation results, and calculates the estimated torque in the transient state by performing the primary delay processing based on the low response target torque 207 and the primary delay coefficient 304. Therefore, since the estimated torque calculation unit 210C does not perform the same calculation every time when the same transient behavior is repeated, the calculation load of the estimated torque calculation unit 210C can be reduced.

Modified Example

Note that the actual intake air amount used in the calculation by the estimated torque calculation unit according to each of the above-described embodiments is assumed to be the intake air flow rate in the cylinder calculated from the measured value of the air flow sensor 108. However, the measured value of the air flow sensor 108 or the value of the intake air pressure, which has a very high correlation with the generated engine torque, may be used for the calculation of the estimated torque calculation unit.

In addition, the calculation processing of the estimated torque using the estimated torque calculation unit according to each of the above-described embodiments can be applied to engine torque control in traction control, auto cruise, automatic transmission, and the like. In addition, it may be applied to combustion switching control (preventing a torque step generated at the time of combustion switching) when switching between stoichiometric combustion and lean combustion.

By the control according to each of the above-described embodiments, it is possible to accurately operate the torque generated from the engine in the transient state so as to reduce the vibration of the vehicle body, and suppress irregular vibration to the vehicle body on which the engine is mounted.

In addition, the control according to each of the above-described embodiments may be used to control the torque generated by an engine other than the turbo engine.

In addition, the present invention is not limited to the above-described embodiment, and can take various other application examples and modifications as long as it does not deviate from the gist of the present invention described in the claims.

For example, the above-described embodiment describes in detail and concretely the configurations of the apparatus and the system in order to explain the present invention in an easy-to-understand manner, and is not necessarily limited to those including all the described configurations. In addition, it is possible to replace a portion of the configuration of the embodiment described here with the configuration of another embodiment, and further, it is possible to add the configuration of another embodiment to the configuration of one embodiment. In addition, it is also possible to add, delete, or replace a portion of the configuration of each embodiment to, from, and with another configuration.

In addition, control lines and information lines indicate what is considered necessary for explanation, and not necessarily all the control lines and information lines on the product. In practice, it can be considered that almost all configurations are connected to each other.

REFERENCE SIGNS LIST 1 torque-based engine compatible with turbo engine
10 engine
102 ECU
203 target torque calculation unit
207 low response target torque
210 estimated torque calculation unit
211 high response target torque
300 target intake air amount calculation unit
301 primary delay coefficient calculation unit
302 primary delay processing unit
303 target intake air amount
304 primary delay coefficient

The invention claimed is:
1. An engine control device comprising:
a target torque calculation unit that calculates target torque of an engine for which torque-based engine control is performed using estimated torque; and
an estimated torque calculation unit that calculates the estimated torque by performing primary delay processing on the target torque using a primary delay coefficient equivalent to a time constant calculated for each control cycle based on a change in an actual intake air amount with respect to a target intake air amount of air sucked into the engine,
the estimated torque calculation unit includes:
a target intake air amount calculation unit that calculates a target intake air amount based on the target torque input from the target torque calculation unit and a speed of the engine, a primary delay coefficient calculation unit that calculates that primary delay coefficient equivalent to the time constant calculated based on the target intake air amount and the actual intake air amount, and a primary delay processing unit that calculates the estimated torque by performing primary delay processing on the target torque based on the target torque and the primary delay coefficient, wherein the estimated torque calculation unit further includes a divergence prevention processing unit that switches the primary delay coefficient calculated by the primary delay coefficient calculation unit to a different value to prevent divergence of the primary delay coefficient when the divergence occurs in the calculation of the primary delay coefficient performed by the primary delay coefficient calculation unit.

2. The engine control device according to claim 1, wherein the primary delay processing unit calculates the estimated torque by performing the primary delay processing on the target torque using the primary delay coefficient calculated in a transient state in which the target torque changes by a set value or more within a set time.

3. The engine control device according to claim 1, wherein the primary delay coefficient calculation unit calculates the primary delay coefficient in a transient state in which the actual intake air amount changes by a set value or more within a set time.

4. The engine control device according to claim 1, wherein the primary delay processing unit calculates the target torque as the estimated torque in a steady state in which the target intake air amount and the actual intake air amount coincide with each other.

5. The engine control device according to claim 1, further comprising an ignition timing correction unit that corrects an ignition timing for igniting fuel injected into a cylinder of the engine so that the estimated torque becomes the target torque.

6. The engine control device according to claim 1, further comprising a fuel cut control unit that performs fuel cut for a cylinder of the engine so that the estimated torque becomes the target torque.

7. The engine control device according to claim 1, further comprising a fuel injection amount control unit that corrects a fuel injection amount of a fuel injection valve that sends fuel to a cylinder of the engine so that the estimated torque becomes the target torque.

8. The engine control device according to claim 1, wherein the estimated torque calculation unit further includes:
a primary delay coefficient limiting processing unit that limits the primary delay coefficient input from the divergence prevention processing unit and outputs the primary delay coefficient to the primary delay processing unit, and a second primary delay processing unit that performs the primary delay processing of the target intake air amount and calculates an estimated intake air amount of the engine based on the target intake air amount and the primary delay coefficient limited by the primary delay coefficient limiting processing unit, and the primary delay coefficient calculation unit calculates the primary delay coefficient using a previous value of the estimated intake air amount instead of a previous value of the actual intake air amount.

9. The engine control device according to claim 8, wherein
the estimated torque calculation unit further includes a constant delay processing unit that performs filter processing with a delay coefficient as a constant to reduce vibration of the actual intake air amount, and the primary delay coefficient calculation unit calculates the primary delay coefficient based on the target intake air amount, the actual intake air amount on which the filter processing is performed, and the estimated intake air amount input from the second primary delay processing unit.

10. The engine control device according to claim 1, wherein
the estimated torque calculation unit further includes:
a constant delay processing unit that performs filter processing with a delay coefficient as a constant to reduce vibration of the actual intake air amount, and an offset processing unit that performs offset processing on the actual intake air amount on which the filter processing is performed by the constant delay processing unit using an offset value obtained in a steady state in which the target intake air amount and the actual intake air amount coincide with each other, and the primary delay coefficient calculation unit calculates the primary delay coefficient based on the target intake air amount, the actual intake air amount on which the offset processing is performed, and an estimated intake air amount of the engine.

11. The engine control device according to claim 10, wherein
the estimated torque calculation unit further includes:
a second primary delay coefficient limiting processing unit that limits the primary delay coefficient by switching a lower limit value of the primary delay coefficient whose divergence is prevented by the divergence prevention processing unit to a different value, and a second primary delay processing unit that calculates the estimated intake air amount of the engine by performing the primary delay processing of the target intake air amount, and outputs the estimated intake air amount to the primary delay coefficient calculation unit based on the target intake air amount and the primary delay coefficient limited by the second primary delay coefficient limiting processing unit.

12. The engine control device according to claim 1, wherein
the estimated torque calculation unit includes:
a past primary delay coefficient storage unit that stores a primary delay coefficient used in the past,
a past primary delay coefficient usage determination unit that determines one of the two primary delay coefficients, which is used, the one primary delay coefficient being output from the primary delay coefficient calculation unit and the other primary delay coefficient being stored in the past primary delay coefficient storage unit and used in a specific driving scene in the past, and outputs a determination result, and
a primary delay coefficient switching unit that switches a primary delay coefficient to any one of the primary delay coefficient read from the past primary delay coefficient storage unit and the primary delay coefficient calculated by the primary delay calculation unit and outputs the primary delay coefficient, based on the determination result when a behavior of the engine is limited in a transient state in which the actual intake air amount changes by a set value or more within a set time when the actual intake air amount changes, and the primary delay processing unit performs primary delay processing based on the target torque and the primary delay coefficient selected by the primary delay coefficient switching unit, and calculates the estimated torque of the engine in the transient state.

13. An engine control method comprising:

calculating using, a target torque calculation unit, target torque of an engine for which torque-based engine control is performed using estimated torque;

calculating, using an estimated torque calculation unit, the estimated torque by performing primary delay processing on the target torque using a primary delay coefficient equivalent to a time constant calculated for each control cycle based on a change in an actual intake air amount with respect to a target intake air amount of air sucked into the engine, calculating, using a target intake air amount calculation unit, a target intake air amount based on the target torque input from the target torque calculation unit and a speed of the engine;

calculating, using a primary delay coefficient calculation unit, the primary delay coefficient equivalent to the time constant calculated based on the target intake air amount and the actual intake air amount, and calculating, using a primary delay processing unit, the estimated torque by performing primary delay processing on the target torque based on the target torque and the primary delay coefficient, wherein the estimated torque calculation unit further includes a divergence prevention processing unit that switches the primary delay coefficient calculated by the primary delay coefficient calculation unit to a different value to prevent divergence of the primary delay coefficient when the divergence occurs in the calculation of the primary delay coefficient performed by the primary delay coefficient calculation unit.

* * * * *